US012243735B2

(12) United States Patent
Naito et al.

(10) Patent No.: US 12,243,735 B2
(45) Date of Patent: Mar. 4, 2025

(54) IMAGING UNIT, MASS SPECTROMETER, AND MASS SPECTROMETRY METHOD

(71) Applicant: HAMAMATSU PHOTONICS K.K., Hamamatsu (JP)

(72) Inventors: Yasuhide Naito, Hamamatsu (JP); Tsuyoshi Hirao, Hamamatsu (JP); Minoru Kondo, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 454 days.

(21) Appl. No.: 17/792,786

(22) PCT Filed: Apr. 7, 2020

(86) PCT No.: PCT/JP2020/015750
§ 371 (c)(1),
(2) Date: Jul. 14, 2022

(87) PCT Pub. No.: WO2021/152874
PCT Pub. Date: Aug. 5, 2021

(65) Prior Publication Data
US 2023/0042588 A1 Feb. 9, 2023

(30) Foreign Application Priority Data
Jan. 31, 2020 (JP) ................................ 2020-015394

(51) Int. Cl.
*H01J 49/16* (2006.01)
*H01J 49/04* (2006.01)

(52) U.S. Cl.
CPC .......... *H01J 49/16* (2013.01); *H01J 49/0418* (2013.01)

(58) Field of Classification Search
CPC .............................. H01J 49/16; H01J 49/0418
See application file for complete search history.

(56) References Cited

FOREIGN PATENT DOCUMENTS

| | | | |
|---|---|---|---|
| JP | H9-265936 | A | 10/1997 |
| JP | 2001-178673 | A | 7/2001 |
| JP | 2007-157353 | A | 6/2007 |
| JP | 2007-157581 | A | 6/2007 |
| JP | 2007-242252 | A | 9/2007 |

(Continued)

OTHER PUBLICATIONS

International Preliminary Report on Patentability mailed Aug. 11, 2022 for PCT/JP2020/015750.

*Primary Examiner* — Nicole M Ippolito
*Assistant Examiner* — Hanway Chang
(74) *Attorney, Agent, or Firm* — Faegre Drinker Biddle & Reath LLP

(57) ABSTRACT

An imaging unit includes a MCP, a fluorescent body, and an imager. The MCP is provided on a flight route of an ionized sample that is a component of a sample ionized and emits electrons in accordance with the ionized sample. The fluorescent body is disposed in a subsequent stage of the MCP and emits fluorescent light in accordance with the electrons emitted from the MCP. The imager is disposed in a subsequent stage of the fluorescent body and has a shutter mechanism configured to be capable of switching an open state in which the fluorescent light is imaged by allowing the fluorescent light from the fluorescent body to pass through and a close state in which the fluorescent light is not imaged by blocking the fluorescent light from the fluorescent body. An afterglow time of the fluorescent body is 12 ns or shorter.

17 Claims, 14 Drawing Sheets

(56) References Cited

FOREIGN PATENT DOCUMENTS

| | | | |
|---|---|---|---|
| JP | 2009-236846 | A | 10/2009 |
| JP | 2016-075574 | A | 5/2016 |
| JP | 2017-120192 | A | 7/2017 |

IMAGING UNIT, MASS SPECTROMETER, AND MASS SPECTROMETRY METHOD

TECHNICAL FIELD

The present disclosure relates to an imaging unit, a mass spectrometry device, and a mass spectrometry method.

BACKGROUND ART

A projection mass spectrometry device that is capable of simultaneously measuring position information and mass information is known as a device that performs image mass spectrometry (for example, refer to Patent Literature 1). According to such a projection mass spectrometry device, since an ion image obtained by irradiating a sample with a probe beam can be enlargedly projected, spatial resolution can be improved, compared to a scanning mass spectrometry device.

CITATION LIST

Patent Literature

Patent Literature 1: Japanese Unexamined Patent Publication No. 2007-157353

SUMMARY OF INVENTION

Technical Problem

In the mass spectrometry device described in Patent Literature 1, it is required to improve not only the spatial resolution but also the accuracy of the mass spectrometry.

Therefore, an object of one aspect of the present disclosure is to provide an imaging unit, a mass spectrometry device, and a mass spectrometry method in which the accuracy of mass spectrometry can be improved.

Solution to Problem

An imaging unit according to one aspect of the present disclosure includes a micro-channel plate being provided on a flight route of an ionized sample that is a component of a sample ionized and emitting electrons in accordance with the ionized sample, a fluorescent body being disposed in a subsequent stage of the micro-channel plate and emitting light in accordance with the electrons emitted from the micro-channel plate, and an imager being provided in a subsequent stage of the fluorescent body and having a shutter mechanism configured to be capable of switching an open state in which the light is imaged by allowing the light from the fluorescent body to pass through and a close state in which the light is not imaged by blocking the light from the fluorescent body, in which an afterglow time of the fluorescent body is 12 ns or shorter.

In such an imaging unit, the afterglow time of the fluorescent body is 12 ns or shorter. That is, the afterglow time of the fluorescent body is short. Accordingly, even when an interval between a timing of one ionized sample and a timing of the other ionized sample is short, the fluorescent body is capable of emitting the light corresponding to the other ionized sample without being affected by the afterglow corresponding to the one ionized sample. Accordingly, the light corresponding to the ionized sample can be accurately emitted. Therefore, according to such an imaging unit, the accuracy of mass spectrometry can be improved.

The imager may include an image intensifier having the shutter mechanism, and a solid-state image sensing device being disposed in a subsequent stage of the image intensifier. Accordingly, the light from the fluorescent body can be amplified by the image intensifier and imaged by the solid-state image sensing device. Accordingly, even when the light from the fluorescent body is extremely weak, the light can be imaged. In addition, a shutter speed of the shutter mechanism of the image intensifier is faster than that of a mechanical shutter mechanism. Accordingly, by using the shutter mechanism of the image intensifier, even when an interval between a timing of one component and a timing of the other component is short, the light corresponding to each of the components can be preferably allowed to pass through or blocked.

A fluorescent material of the fluorescent body may be GaN, ZnO, or a plastic scintillator. Accordingly, the afterglow time of the fluorescent material can be shortened. Accordingly, as described above, the light corresponding to each of the components can be accurately emitted, and the accuracy of the mass spectrometry can be improved.

The imaging unit may further include a connection portion optically connecting the fluorescent body and the imager, in which the connection portion may be a lens or a fiber optical plate. Accordingly, fluorescent light from the fluorescent body can be suitably propagated to the imager.

The connection portion may be the fiber optical plate, the fluorescent body is formed on one surface of the fiber optical plate on a side opposite to the imager, and the other surface of the fiber optical plate on a side opposite to the one surface may be connected to the imager. Accordingly, the fluorescent body 42C and the imager 43 can be optically connected by a simple configuration.

A mass spectrometry device according to one aspect of the present disclosure includes the imaging unit described above, a sample stage on which the sample is placed, an irradiator irradiating the sample with an energy beam to ionize a plurality of components of the sample while maintaining position information of the plurality of components, and a controller controlling an opening and closing operation of the shutter mechanism, in which the controller allows the imager to image the light corresponding to each of the plurality of components by performing the opening and closing of the shutter mechanism at a timing for each of the components.

In such a mass spectrometry device, the plurality of components of the sample are ionized while maintaining the position information of the plurality of components. That is, such a mass spectrometry device is a projection mass spectrometry device. Accordingly, spatial resolution of the mass spectrometry can be improved, compared to a scanning mass spectrometry device. In addition, the controller allows the imager to image the light corresponding to each of the plurality of components by performing the opening and closing of the shutter mechanism at a timing for each of the components. Accordingly, the light can be imaged for each of the components. Accordingly, the amount of information in one imaging can be suppressed, and a decrease in a processing speed can be suppressed. Therefore, according to such a mass spectrometry device, the accuracy of the mass spectrometry can be improved, and the improvement of the spatial resolution and the suppression of a decrease in the processing speed can be attained.

The controller may allow the imager to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the controller may allow the imager to execute the imaging processing while changing the specific component for the each event, in a plurality of events. Accordingly, the light corresponding to the plurality of components can be imaged while suppressing the amount of information in one imaging.

The controller may perform the opening and closing of the shutter mechanism a plurality of times for each timing when the light corresponding to each of the plurality of components reaches the imager, in one event corresponding to one irradiation of the energy beam by the irradiator. Accordingly, the light corresponding to the plurality of components can be efficiently imaged while suppressing the amount of information in one imaging.

The mass spectrometry device may further include a data processor processing data of an image imaged by the imager, in which the controller may perform the opening and closing of the shutter mechanism such that the shutter mechanism is in the open state during a first period including a time point when the light corresponding to each of n (n is an integer of 2 or more) components reaches the imager, in a first event corresponding to one irradiation of the energy beam by the irradiator, and may perform the opening and closing of the shutter mechanism such that the shutter mechanism is in the open state during a second period including a time point when the light corresponding to each of n−1 components excluding a specific component from the n components reaches the imager, in the second event different from the first event, and the data processor may acquire an image corresponding to the specific component, on the basis of a difference between an image imaged by the imager in the first event and an image imaged by the imager in the second event. Accordingly, the limitation of the shutter speed of the shutter mechanism can be eased. That is, even when the light corresponding to the component different from the specific component is imaged during the period of the open state due to a comparatively slow shutter speed of the shutter mechanism (that is, a comparatively long period of the open state), the image corresponding to the specific component can be acquired.

The controller may allow the imager to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the controller may allow the imager to execute the imaging processing for the each event, in a plurality of events. Accordingly, the light corresponding to one specific component can be imaged a plurality of times. That is, a plurality of images are obtained for the same component (specific component). According to the configuration described above, a clear image focusing on only one specific component among the plurality of components can be obtained by superimposing (integrating) the plurality of images obtained as described above.

The controller may set a timing for each of the components by adjusting at least one of an opening and closing timing of the shutter mechanism based on a time point when the energy beam is irradiated, a distance between the sample stage and the micro-channel plate, and a flight speed of the ionized sample. Accordingly, the light can be flexibly imaged for each of the components.

A mass spectrometry method according to one aspect of the present disclosure includes a first step of allowing an irradiator irradiating an energy beam to irradiate a sample with the energy beam to ionize a plurality of components of the sample while maintaining position information of the plurality of components, a second step of allowing a micro-channel plate provided on a flight route of an ionized sample that is the component of the sample ionized by the irradiation of the energy beam to emit electrons in accordance with the ionized sample, a third step of allowing a fluorescent body disposed in a subsequent stage of the micro-channel plate to emit light in accordance with the electrons, and a fourth step of allowing an imager being disposed in a subsequent stage of the fluorescent body and having a shutter mechanism configured to be capable of switching an open state in which the light is imaged by allowing the light from the fluorescent body to pass through and a close state in which the light is not imaged by blocking the light from the fluorescent body to image the light, in which in the fourth step, the imager is allowed to image the light corresponding to each of the plurality of components by performing the opening and closing of the shutter mechanism at a timing for each of the components, and an afterglow time of the fluorescent body is 12 ns or shorter.

In such a mass spectrometry method, in the first step, the plurality of components are ionized while maintaining the position information of the plurality of components of the sample. That is, such a mass spectrometry method is a projection mass spectrometry method. Accordingly, spatial resolution of mass spectrometry can be improved. In addition, in the fourth step, the imager is allowed to image the light corresponding to each of the plurality of components by performing the opening and closing of the shutter mechanism at a timing for each of the components. Accordingly, the light can be imaged for each of the components. Accordingly, the amount of information in one imaging can be suppressed, and a decrease in a processing speed can be suppressed. In addition, the afterglow time of the fluorescent body is 12 ns or shorter. That is, the afterglow time of the fluorescent body is short. Accordingly, even when an interval between a timing of one ionized sample and a timing of the other ionized sample is short, in the third step, the fluorescent body is capable of emitting the light corresponding to the other ionized sample without being affected by the afterglow corresponding to the one ionized sample. Accordingly, the light corresponding to the ionized sample can be accurately imaged. Therefore, according to such a mass spectrometry method, the accuracy of the mass spectrometry can be improved, and the improvement of the spatial resolution and the suppression of a decrease in the processing speed can be attained.

In the fourth step, imaging processing of imaging only the light corresponding to a specific component that is one of the components may be executed by performing the opening and closing of the shutter mechanism at a timing when the light corresponding to the specific component reaches the imager, for each event corresponding to one irradiation of the energy beam by the irradiator, and the imaging processing may be executed while changing the specific component for the each event, in a plurality of events. Accordingly, the light corresponding to the plurality of components can be imaged while suppressing the amount of information in one imaging.

In the fourth step, the opening and closing of the shutter mechanism may be performed a plurality of times for each timing when the light corresponding to each of the plurality of components reaches the imager, in one event corresponding to one irradiation of the energy beam by the irradiator. Accordingly, the light corresponding to the plurality of components can be efficiently imaged while suppressing the amount of information in one imaging.

The mass spectrometry method may further include a fifth step of processing data of an image imaged by the imager, in which in the fourth step, the opening and closing of the shutter mechanism may be performed such that the shutter mechanism is in the open state during a first period including a time point when the light corresponding to each of n (n is an integer of 2 or more) components reaches the imager, in a first event corresponding to one irradiation of the energy beam by the irradiator, and the opening and closing of the shutter mechanism may be performed such that the shutter mechanism is in the open state during a second period including a time point when the light corresponding to each of n−1 components excluding a specific component from the n components reaches the imager, in a second event different from the first event, and in the fifth step, an image corresponding to the specific component may be acquired on the basis of a difference between an image imaged by the imager in the first event and an image imaged by the imager in the second event. Accordingly, the limitation of the shutter speed of the shutter mechanism can be eased. That is, even when the light corresponding to the component different from the specific component is imaged during the period of the open state due to a comparatively slow shutter speed of the shutter mechanism (that is, a comparatively long period of the open state), the image corresponding to the specific component can be acquired.

In the fourth step, the imager may be allowed to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the imager may be allowed to execute the imaging processing of imaging only the light corresponding to the specific component for the each event, in a plurality of events. Accordingly, the light corresponding to one specific component can be imaged a plurality of times. That is, a plurality of images are obtained for the same component (specific component). According to the configuration described above, a clear image focusing on only one specific component among the plurality of components can be obtained by superimposing (integrating) the plurality of images obtained as described above.

In the fourth step, a timing for each of the components may be set by adjusting at least one of an opening and closing timing of the shutter mechanism based on a time point when the energy beam is irradiated, a distance between a sample stage on which the sample is placed and the micro-channel plate, and a flight speed of the ionized sample. Accordingly, the light can be flexibly imaged for each of the components.

Advantageous Effects of Invention

According to one aspect of the present disclosure, it is possible to provide an imaging unit, a mass spectrometry device, and a mass spectrometry method in which the accuracy of mass spectrometry can be improved.

DESCRIPTION OF EMBODIMENTS

Figure 1:
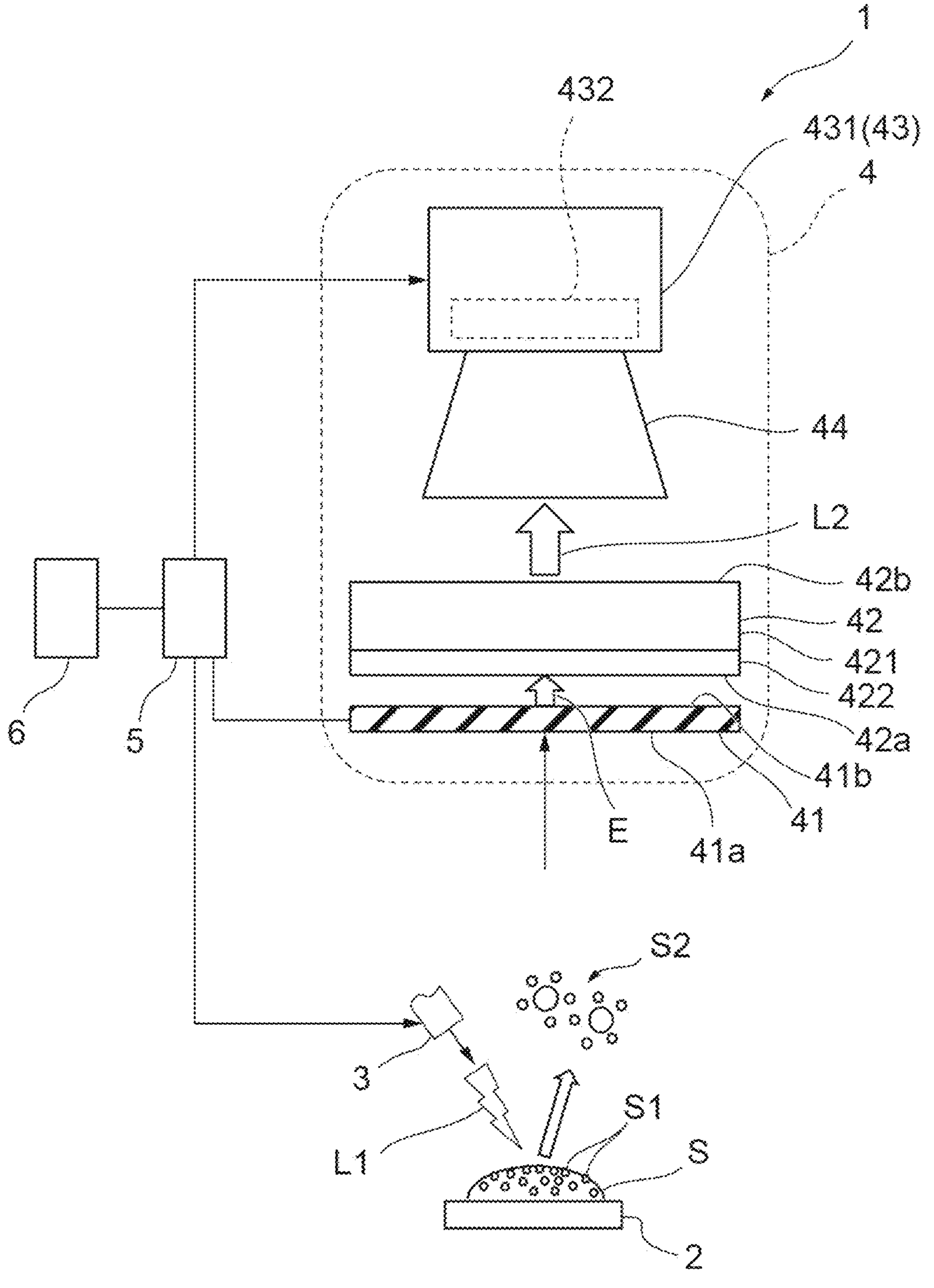
FIG. 1 is a schematic view of a mass spectrometry device of one embodiment.

Hereinafter, an embodiment of the present disclosure will be described with reference to the drawings. In each of the drawings, the same reference numerals will be applied to the same or corresponding parts, and the repeated description will be omitted.

[Mass Spectrometry Device] FIG. 1 is a schematic view of a mass spectrometry device 1. As illustrated in FIG. 1, the mass spectrometry device 1 includes a sample stage 2, an irradiator 3, an imaging unit 4, a controller 5, and a data processor 6. The mass spectrometry device 1 is used in a mass spectrometry method such as a laser desorption/ionization (LDI) method, a surface-assisted laser desorption/ionization (SALDI) method, a matrix-assisted laser desorption/ionization (MALDI) method, and a secondary ion mass spectrometry (SIMS) method. In addition, the mass spectrometry device 1 may be used in a mass spectrometry method using an ionization-assisted substrate DIUTHAME manufactured by HAMAMATSU PHOTONICS K.K.

A sample S is placed on the sample stage 2. Note that, when a support substrate supporting the sample S (for example, the ionization-assisted substrate described above) is used, the support substrate is placed on the sample stage 2, together with the sample S. The sample stage 2, for example, is a glass substrate on which a transparent conductive film such as an indium tin oxide (ITO) film is formed, and the surface of the transparent conductive film is a placement surface. A voltage is applied to the sample stage 2. Note that, the sample stage 2 may be a member that is capable of ensuring conductivity (for example, a substrate containing a metal material such as stainless steel, and the like). The sample S, for example, is a biological sample. The irradiator 3 is disposed on a surface side of the sample stage 2 on which the sample S is placed. The irradiator 3 irradiates the sample S with an energy beam L1. Accordingly, the irradiator 3 ionizes a plurality of components S1 of the sample S while maintaining position information of the plurality of components S1. The component S1 of the sample S is ionized to an ionized sample S2 by the irradiation of the energy beam L1. Note that, the sample stage 2 may be fixed by interposing both end portions (both sides) of the sample stage 2 with a metal or the like. In this case, the irradiator 3 may be disposed on a side (a back side) of the sample stage 2 opposite to the surface on which the sample S is placed. That is, the irradiator 3 may irradiate the sample S with the energy beam L1 from the back side of the sample stage 2.

The irradiator 3 collectively irradiates a predetermined range having a predetermined area in the sample S with the energy beam L1. In this embodiment, the irradiator 3 irradiates the sample S with the energy beam L1 that is a flat beam having a spot diameter of a size including the predetermined range. Note that, the size of the spot diameter of the energy beam L1 may be a size including the entire sample S that is a measurement target, or may be a size including only a part of the sample S. In the latter case, an image of the entire sample S can be obtained by irradiating the sample S with the energy beam L1 a plurality of times while moving an irradiation position of the energy beam L1 (a position on the sample S that is irradiated with the energy beam L1). When the energy beam L1 is irradiated, the plurality of components S1 of the sample S in the predetermined range are collectively ionized. The mass spectrometry device 1 is a projection mass spectrometry device. More specifically, in a scanning mass spectrometry device, a signal of one pixel having a size corresponding to the spot diameter of the energy beam is acquired for each irradiation of the energy beam. In contrast, in the mass spectrometry device 1, a signal of an image (a plurality of pixels) corresponding to the spot diameter of the energy beam L1 is acquired for each irradiation of the energy beam L1. According to such a projection mass spectrometry device 1, high definition (spatial resolution) is attained, compared to the scanning mass spectrometry device.

The energy beam L1, for example, is laser light. The energy beam L1, for example, is N2 laser, YAG laser, or the like. An intensity distribution of the energy beam L1 (an intensity distribution on a sectional surface perpendicular to an axis line) is approximately even. The spot diameter of the energy beam L1, for example, is approximately 100 μm to 300 μm. The energy beam L1 may be an electron beam or an ion beam. The irradiator 3 pulsatively irradiates the energy beam L1. The irradiator 3 irradiates the energy beam L1 for each event. The irradiator 3 irradiates the energy beam L1 once in one event. That is, one irradiation of the energy beam L1 corresponds to one event.

The imaging unit 4 includes a micro-channel plate (hereinafter, referred to as "MCP") 41, a fluorescent body 42, an imager 43, and an optical lens (a connection portion) 44. The MCP 41 is provided on a flight route of the ionized sample S2 that is the component S1 of the sample S ionized by the irradiation of the energy beam L1. In this embodiment, as an example, the flight route of the ionized sample S2 is approximately linear toward the MCP 41 from the sample stage 2, and the MCP 41 is provided facing the sample stage 2. Here, the flight route for guiding the ionized sample S2 to the MCP 41 from the sample stage 2 while maintaining position information of an area in the spot diameter of the energy beam L1 is not limited to being approximately linear. Therefore, the MCP 41 is not necessarily limited to being provided in a position facing the sample stage 2. For example, when triple focusing time-of-flight (TRIFT) for flying the ionized sample S2 by bending the trajectory of the ionized sample S2 three times, reflectron for flying the ionized sample S2 in a V shape, MULTUM for flying the ionized sample S2 in a 8 shape, and the like are used as a method for guiding the ionized sample S2 to the MCP 41 from the sample stage 2, the MCP 41 is provided on the flight route of the ionized sample S2 but does not face the sample stage 2.

A voltage is applied to the MCP 41. The ionized sample S2 ionized on the sample stage 2 is flown toward the MCP 41 in accordance with a potential difference between the voltage to be applied to the sample stage 2 and the voltage to be applied to the MCP 41, and collides with the MCP 41. A plurality of ionized samples S2 are flown while maintaining the position information, and collide with the MCP 41 in a state of including time difference information caused by a mass difference. That is, the ionized sample S2 reaches the MCP 41 at different timings according to the mass difference for each type.

The MCP 41 emits electrons E in accordance with the ionized sample S2. Specifically, the MCP 41 includes an input surface 41*a* facing the sample stage 2, and an output surface 41*b* on a side opposite to the input surface 41*a*. The input surface 41*a* and the output surface 41*b* are disposed to intersect with a predetermined reference axis in a state of facing each other. The MCP 41 outputs the electrons E from the output surface 41*b* in response to the incidence of ions (charged particles) onto the input surface 41*a*. The MCP 41 converts a spatial distribution of the ions into a spatial distribution (an electron image) of the electrons.

The MCP 41 has a plate-shaped structure in which a plurality of glass capillaries (channels) having an inner diameter of several μm to several dozen μm are bundled. Each of the channels of the MCP 41 functions as an independent secondary electron multiplier. Therefore, according to the MCP 41, when the ions reach the surface of the channel, the ions are converted into secondary electrons, and the electrons can be multiplied while repeating the collision in the channel. A time from the ion collision to the extraction as the secondary electron is several nanoseconds or shorter. Note that, the imaging unit 4 may include a plurality of stages of the MCP 41.

The fluorescent body 42 is disposed in the subsequent stage of the MCP 41. That is, the fluorescent body 42 is disposed on a side of the MCP 41 opposite to the sample stage 2. The fluorescent body 42 includes an input surface 42*a* facing the MCP 41, and an output surface 42*b* on a side opposite to the input surface 42*a*. The input surface 42*a* functions as an electron detection surface.

The fluorescent body 42 includes a substrate 421 and a fluorescent layer 422. The fluorescent body 42 is disposed such that the fluorescent layer 422 faces the MCP 41. The fluorescent layer 422 includes the input surface 42*a*, and the substrate 421 includes the output surface 42*b*. The material of the substrate 421, for example, is transparent glass or the like. The material of the substrate 421, for example, may be sapphire or the like. The fluorescent layer 422 is applied to the surface of the substrate 421 on a side opposite to the output surface 42*b*. The fluorescent layer 422 contains a fluorescent material that emits fluorescent light when colliding with the electrons. The fluorescent material of the fluorescent layer 422, for example, is GaN. The fluorescent material of the fluorescent layer 422, for example, may be ZnO or a plastic scintillator.

The fluorescent layer 422 emits fluorescent light L2 in accordance with the electrons E emitted from the MCP 41. The fluorescent layer 422 converts the fluorescent light L2 generated by the collision of the electron E into a fluorescent pattern (an optical image). The fluorescent material has afterglow properties in which light is emitted even after there is no electron excitation and gradually weakened. An afterglow time of the fluorescent layer 422 is 12 ns or shorter. The afterglow time of the fluorescent layer 422, for example, is approximately 3 ns. That is, the fluorescent body 42 is a so-called high-speed fluorescent body. In the mass spectrometry device 1, the MCP 41 and the fluorescent layer 422 are close to each other in a range where discharge does not occur, and a high voltage is applied to each of the MCP 41 and the fluorescent layer 422. In the mass spectrometry device 1, by allowing the ions and the electrons to collide with the MCP 41 and the fluorescent layer 422 at a high speed, respectively, a signal amplification factor (a gain) and the position information are compatible.

When the fluorescent material of the fluorescent layer 422 is GaN or ZnO, the fluorescent layer 422, for example, can be formed by the epitaxial growth of the fluorescent material on the substrate 421 (for example, a sapphire substrate). In this case, the thickness of the fluorescent layer 422, for example, is approximately 1 μm to 5 μm. Alternatively, the fluorescent layer 422, for example, may be formed by applying a powdered fluorescent material containing a ZnO onto the substrate 421 (for example, the sapphire substrate). In this case, the thickness of the fluorescent layer 422, for example, is approximately 2 μm to 8 μm.

The imager 43 is disposed in the subsequent stage of the fluorescent body 42. That is, the imager 43 is disposed on a side of the fluorescent body 42 opposite to the MCP 41. The imager 43 includes a solid-state image sensing device 431. The solid-state image sensing device 431, for example, is a CMOS image sensor. The solid-state image sensing device 431, for example, may be a CCD image sensor or a high-speed image sensor.

The solid-state image sensing device 431 includes a shutter mechanism 432. The shutter mechanism 432 is configured to be capable of switching an open state in which the fluorescent light L2 is imaged by allowing the fluorescent light L2 from the fluorescent body 42 to pass through and a close state in which the fluorescent light L2 is not imaged by blocking the fluorescent light L2 from the fluorescent body 42. A shutter speed of the shutter mechanism 432 is approximately the same as the afterglow time of the fluorescent layer 422. The shutter speed of the shutter mechanism 432, for example, is approximately 3 ns. An opening and closing timing of the shutter mechanism 432 is variable.

The optical lens 44 is disposed between the fluorescent body 42 and the imager 43. The optical lens 44 optically connects the fluorescent body 42 and the imager 43. The optical lens 44 is connected to the imager 43. The optical lens 44 guides the fluorescent light L2 from the fluorescent body 42 to the imager 43.

The controller 5 controls the operation of the irradiator 3 and the imager 43. The controller 5 controls the irradiator 3 to pulsatively irradiate the energy beam L1. The controller 5 controls the opening and closing operation of the shutter mechanism 432 of the solid-state image sensing device 431. The controller 5 controls the imager 43 to execute imaging processing. The controller 5, for example, is a computer device including a processor (for example, CPU and the like), a memory (for example, ROM, RAM, and the like), and the like. The data processor 6 processes data of an image that is imaged by the imager 43. The data processor 6, for example, is a computer device including a processor (for example, CPU and the like), a memory (for example, ROM, RAM, and the like), and the like. In the example of FIG. 1, the controller 5 and the data processor 6 are separately described, but the controller 5 and the data processor 6 may be configured by the same computer device.

Figure 2:
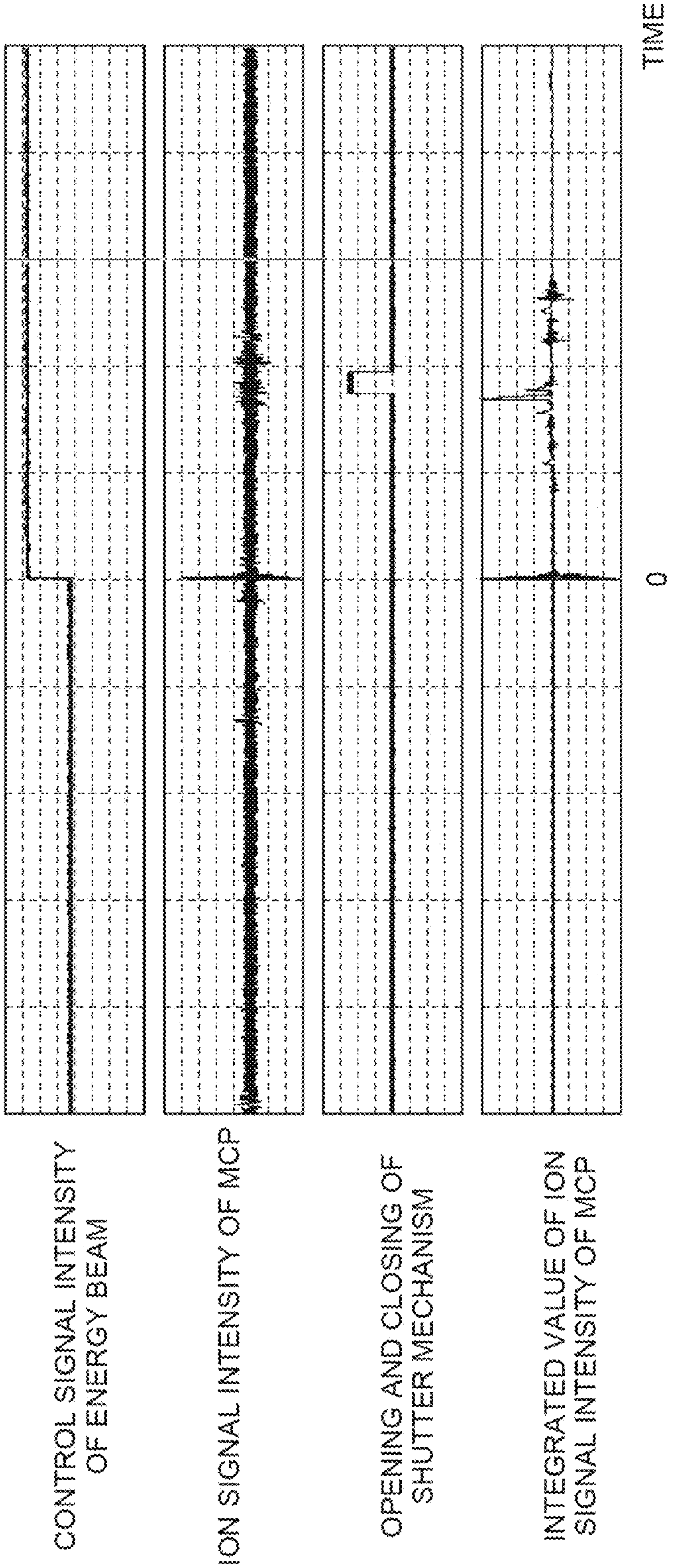
FIG. 2 is a diagram illustrating a time change of various signals of the mass spectrometry device of FIG. 1.

FIG. 2 is a diagram illustrating a time change of various signals of the mass spectrometry device 1. As illustrated in FIG. 2, the controller 5 acquires signals from the irradiator 3, the MCP 41, and the imager 43. A horizontal axis of FIG. 2 indicates a time. A vertical axis of FIG. 2 indicates control signal intensity of the energy beam L1, ion signal intensity of the MCP 41, the opening and closing of the shutter mechanism 432, and an integrated value of the ion signal intensity of the MCP 41 in a predetermined period, in order from the top. The control signal intensity of the energy beam L1 is signal intensity of the energy beam L1 that is detected by a detector (not illustrated) of the irradiator 3. The detector detects whether or not the energy beam L1 is irradiated, a timing (a time point) when the energy beam L1 is irradiated, and the like. In the mass spectrometry device 1, the opening and closing and the like of the shutter mechanism 432 is controlled on the basis of a timing when the energy beam L1 is irradiated. In this embodiment, a time point when the sample S is irradiated with the energy beam L1 (hereinafter, referred to as a "reference point") is set to a time start reference "0". The controller 5, for example, is capable of performing the opening and closing of the shutter mechanism at a timing when an integrated value of the output of the MCP 41 reaches a peak. Note that, the opening and closing of the shutter mechanism indicates one operation from the open state to the close state after the shutter mechanism is in the open state.

The controller 5 allows the imager 43 to image the fluorescent light L2 corresponding to each of the plurality of components S1 by performing the opening and closing of the shutter mechanism 432 at a timing for each of the components S1 of the sample S (that is, for each type of components contained in the sample S). The timing for each of the components S1 indicates a timing when the fluorescent light L2 corresponding to the component S1 reaches the imager 43, as an example. The controller 5 performs the opening and closing of the shutter mechanism 432 once at a timing when the fluorescent light L2 corresponding to one of the components S1 reaches the imager 43.

The controller 5 allows the imager 43 to execute the imaging processing of imaging only the fluorescent light L2 corresponding to a specific component that is one of the components S1 by performing the opening and closing of the shutter mechanism 432 at a timing when the fluorescent light L2 corresponding to the specific component reaches the imager 43, for each event. That is, in this embodiment, the controller 5 allows the imager 43 to image only the fluorescent light L2 corresponding to one specific component, in one event. One event is a period including the entire operation of the mass spectrometry device 1 from the irradiation of the energy beam L1 by the irradiator 3 to the obtainment of an image of mass spectrometry by the irradiation of the energy beam L1. Note that, "imaging only the fluorescent light L2 corresponding to the specific component" includes not only a case where fluorescent light other than the fluorescent light L2 corresponding to the specific component is not imaged at all, but also a case where fluorescent light (noise) corresponding to other components that are negligible in the measurement and different from the specific component is imaged, together with the specific component.

The control of the controller 5 will be described in detail. The masses of the ionized samples S2 corresponding to each of the plurality of components S1 of the sample S are different from each other. Accordingly, the plurality of ionized samples S2 sequentially reach the MCP 41 in a state of including the time difference information caused by the mass difference. That is, when the potential difference between the sample stage 2 and the MCP 41 and a distance between the sample stage 2 and the MCP 41 are constant, a timing when each of the plurality of ionized samples S2 reaches the MCP 41 after the sample S is irradiated with the energy beam L1 is different for each of the components S1 of the sample S. Therefore, the MCP 41 sequentially emits the electrons for each timing when the ionized sample S2 reaches the MCP 41.

Figure 3:
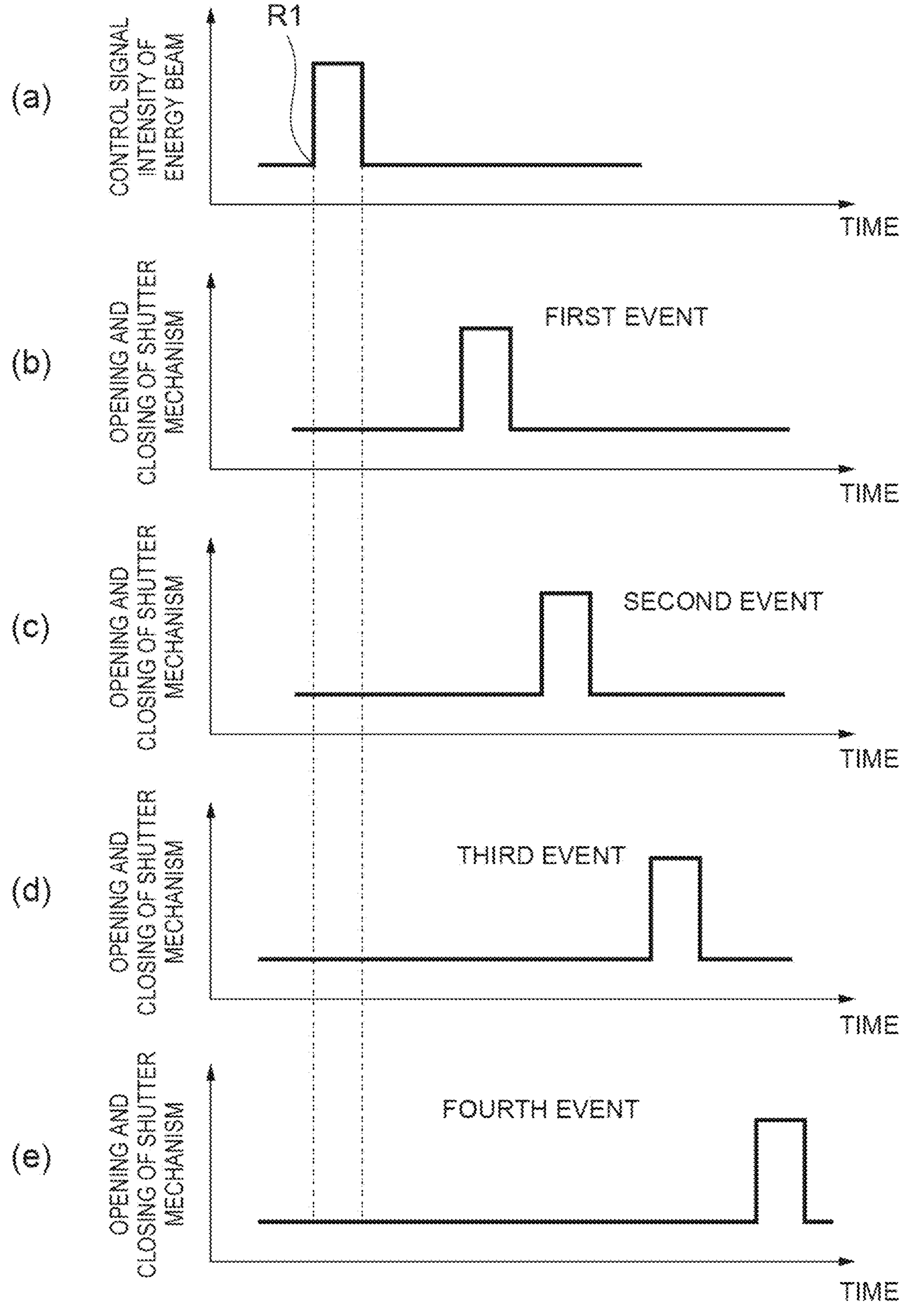
FIG. 3 is a diagram illustrating an opening and closing timing of a shutter mechanism in a plurality of events.

In this embodiment, the description will be provided focusing on a first event to a fourth event. (a) in FIG. 3 is a diagram illustrating a reference point R1. In this embodiment, a time point when the control signal intensity of the energy beam L1 starts to rise is set to the reference point R1. Each of (b) to (e) in FIG. 3 3 is a diagram illustrating the opening and closing timing of the shutter mechanism 432 in each of the first event to the fourth event. As illustrated in FIG. 3, the controller 5 performs the opening and closing of the shutter mechanism 432 at timings different from each other on the basis of the reference point R1, in each of the first event to the fourth event.

Figure 4:
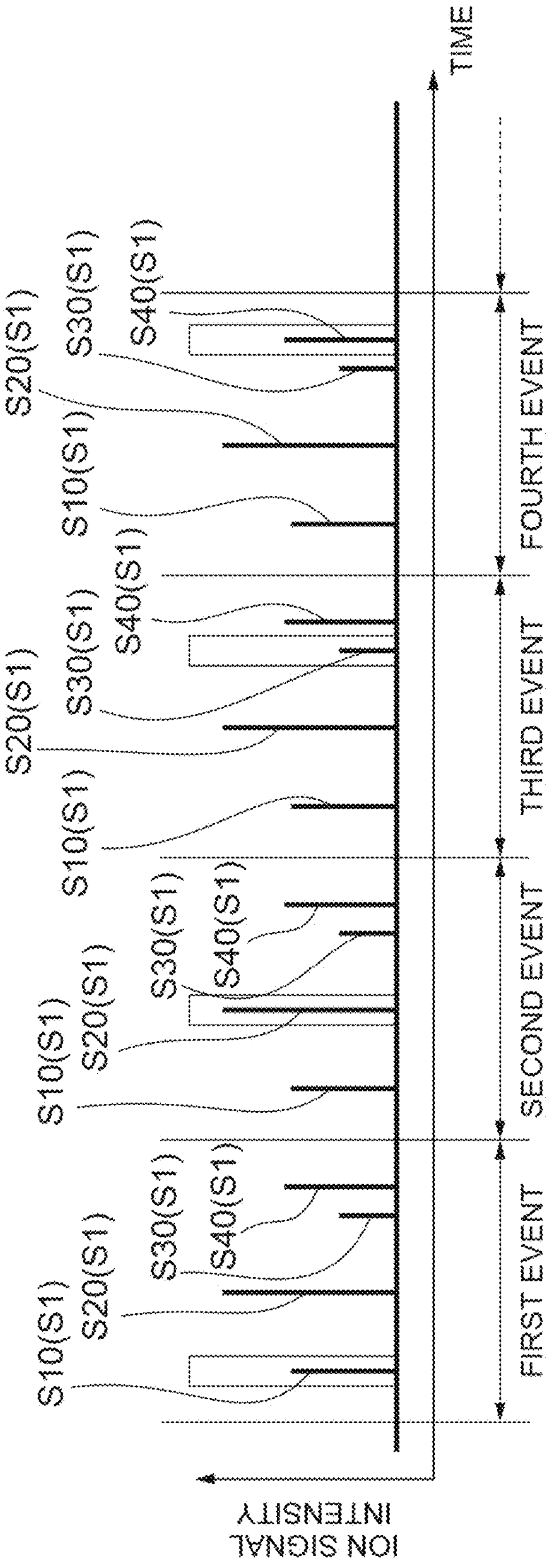
FIG. 4 is a diagram illustrating ion signal intensity of an ionized sample and the opening and closing timing of the shutter mechanism in the plurality of events.

FIG. 4 is a diagram illustrating the ion signal intensity of the ionized sample S2 and the opening and closing timing of the shutter mechanism 432 in the plurality of events. As illustrated in FIG. 4, ion signals (spectrums) corresponding to the plurality of (here, four) components S1 (S10, S20, S30, and S40) of the sample S are sequentially detected by the MCP 41, in each of the first event to the fourth event. In this example, a time order in which the sample S is irradiated with the energy beam L1, and then, reaches the MCP 41 is in the order of the components S10, S20, S30, and S40. The controller 5 allows the imager 43 to execute the imaging processing while changing the specific component for the each event, in the plurality of events of the first event to the fourth event.

Specifically, in the first event, the controller 5 performs the opening and closing of the shutter mechanism 432 once at a timing according to the component S10 (a timing when the fluorescent light L2 corresponding to the component S10 reaches the imager 43). That is, the controller 5 allows the imager 43 to execute the imaging processing with the component S10 as the specific component, in the first event.

In the second event, the controller 5 performs the opening and closing of the shutter mechanism 432 once at a timing according to the component S20 (a timing when the fluorescent light L2 corresponding to the component S20 reaches the imager 43). That is, the controller 5 allows the imager 43 to execute the imaging processing with the component S20 as the specific component, in the second event.

In the third event, the controller 5 performs the opening and closing of the shutter mechanism 432 once at a timing according to the component S30 (a timing when the fluorescent light L2 corresponding to the component S30 reaches the imager 43). That is, the controller 5 allows the imager 43 to execute the imaging processing with the component S30 as the specific component, in the third event.

In the fourth event, the controller 5 performs the opening and closing of the shutter mechanism 432 once at a timing according to the component S40 (a timing when the fluorescent light L2 corresponding to the component S40 reaches the imager 43). That is, the controller 5 allows the imager 43 to execute the imaging processing with the component S40 as the specific component, in the fourth event.

As described above, the controller 5 controls the opening and closing of the shutter mechanism 432 such that only the fluorescent light L2 corresponding to one specific component passes through the shutter mechanism 432 for each event. Accordingly, only the fluorescent light L2 corresponding to one specific component is imaged for each event.

The controller 5 sets a timing for each of the components S1 by adjusting the opening and closing timing of the shutter mechanism 432 based on the reference point R1. The controller 5 adjusts the opening and closing timing of the shutter mechanism 432 such that the shutter mechanism 432 is in the open state from the reference point R1 during a period including a timing when the fluorescent light L2 corresponding to the specific component reaches the imager 43, in the each event.

Note that, a timing when the fluorescent light L2 corresponding to each of the specific components reaches the imager 43 may be calculated by using data for each of the components S1 of the sample S, in the each event. In addition, the timing when the fluorescent light L2 corresponding to each of the specific components reaches the imager 43 may be measured in advance by irradiating the sample S with the energy beam L1. That is, each timing when each of the ionized samples S2 reaches the MCP 41 can be acquired on the basis of the reference point R1 by irradiating the sample S with the energy beam L1 to acquire the ion signal intensity of the MCP 41, prior to the each event. Such a timing is a timing when the each fluorescent light L2 corresponding to each of the specific components reaches the imager 43.

The controller 5 repeats each of the first event to the fourth event a plurality of times. For example, the controller 5 repeatedly executes a set of processings of "First Event→Second Event→Third Event→Fourth Event" a plurality of times. Alternatively, the controller 5 may repeatedly execute a set of processings of "First Event→Second Event→Third Event→Fourth Event" and a set of processings of "Fourth Event→Third Event→Second Event→First Event", alternately.

When the sample S is repeatedly irradiated with the energy beam L1, the sample S is ionized, and the amount of sample S decreases. Accordingly, the ion signal intensity corresponding to each of the components S1 tends to be weak. For example, when repeating the second event a plurality of times after the first event is repeated a plurality of times, the ion signal intensity corresponding to the component S20 tends to be weaker than the ion signal intensity corresponding to the component S10. Accordingly, an image of the component S20 may be unclear, compared to an image of the component S10. In this embodiment, by repeating the each event in the order as described above and by performing processing of superimposing a plurality of images acquired for each of the components S1 (the processing of the data processor 6 described below), the clearness of the image corresponding to each of the components S10, S20, S30, and S40 can be even.

The data processor 6 performs the processing of superimposing the plurality of images imaged by the imager 43. Specifically, the data processor 6 performs the processing of superimposing each of the images imaged in the first event to the fourth event. Accordingly, an image corresponding to each of the specific components in the first event to the fourth event can be observed in one image. Further, the data processor 6 performs the processing of superimposing all of the images imaged by repeating each of the first event to the fourth event a plurality of times. Accordingly, a clearer image is obtained by superimposing (integrating) the images that are imaged a plurality of times for the same component S1.

As described above, in the imaging unit 4, an afterglow time of the fluorescent body 42 is 12 ns or shorter. That is, the afterglow time of the fluorescent body 42 is short. Accordingly, even when an interval between a timing of one ionized sample S2 and a timing of the other ionized sample S2 is short, the fluorescent body 42 is capable of emitting the fluorescent light L2 corresponding to the other ionized sample S2 without being affected by the afterglow corresponding to the one ionized sample S2. Accordingly, the fluorescent light L2 corresponding to the ionized sample S2 can be accurately emitted. Therefore, according to the imaging unit 4, the accuracy of the mass spectrometry can be improved.

A fluorescent material of the fluorescent body 42 is GaN, ZnO, or a plastic scintillator. Accordingly, the afterglow time of the fluorescent material can be shortened. Accordingly, as described above, the fluorescent light L2 corresponding to each of the components S1 can be accurately emitted, and the accuracy of the mass spectrometry can be improved.

The imaging unit 4 includes the optical lens 44 optically connecting the fluorescent body 42 and the imager 43. Accordingly, the fluorescent light L2 of the fluorescent body 42 can be suitably propagated to the imager 43 while maintaining the definition of an image imaged by the imager 43.

In the mass spectrometry device 1, the plurality of components S1 are ionized while maintaining the position information of the plurality of components S1 of the sample S. That is, the mass spectrometry device 1 is the projection mass spectrometry device. Accordingly, the spatial resolution of the mass spectrometry can be improved, compared to the scanning mass spectrometry device. In addition, the controller 5 allows the imager 43 to image the fluorescent light L2 corresponding to each of the plurality of components S1 by performing the opening and closing of the shutter mechanism 432 at a timing for each of the components S1. Accordingly, the fluorescent light L2 can be imaged for each of the components S1. Accordingly, the amount of information in one imaging can be suppressed, and a decrease in the processing speed can be suppressed. Therefore, according to the mass spectrometry device 1, the accuracy of the mass spectrometry can be improved, and the improvement of the spatial resolution and the suppression of a decrease in the processing speed can be attained.

The controller 5 allows the imager 43 to execute the imaging processing of imaging only the fluorescent light L2 corresponding to the specific component that is one of the components S1 by performing the opening and closing of the shutter mechanism 432 at a timing when the fluorescent light L2 corresponding to the specific component reaches the imager 43, for each event corresponding to one irradiation of the energy beam L1 by the irradiator 3. The controller 5 allows the imager 43 to execute the imaging processing while changing the specific component for the each event, in the plurality of events. Accordingly, the fluorescent light L2 corresponding to the plurality of components S1 can be imaged while suppressing the amount of information in one imaging.

The controller 5 sets a timing for each of the components S1 by adjusting the opening and closing timing of the shutter mechanism 432 based on the reference point R1. Accordingly, the fluorescent light L2 can be flexibly imaged for each of the components S1.

[Mass Spectrometry Method] Next, a mass spectrometry method of the sample S using the mass spectrometry device 1 will be described with reference to FIG. 1 and FIG. 4.

First, as illustrated in FIG. 1, the sample S is placed on the sample stage 2. Subsequently, the irradiator 3 is allowed to irradiate the sample S with the energy beam L1 (a first step). Accordingly, the plurality of components S1 of the sample S are ionized while maintaining the position information of the plurality of components S1. The component S1 of the sample S is ionized to the ionized sample S2 by the irradiation of the energy beam L1. Subsequently, the MCP 41 is allowed to emit the electrons E in accordance with the ionized sample S2 (a second step). Subsequently, the fluorescent body 42 is allowed to emit the fluorescent light L2 in accordance with the electrons E (a third step). Subsequently, the imager 43 is allowed to image the fluorescent light L2 (a fourth step). Subsequently, the data of the image imaged by the imager 43 is processed (a fifth step).

In the fourth step, as described above, the imager 43 is allowed to image the fluorescent light L2 corresponding to each of the plurality of components S1 by performing the opening and closing of the shutter mechanism 432 at a timing for each of the components S1. Specifically, in the fourth step, as described above, the imager 43 is allowed to execute the imaging processing of imaging only the fluorescent light L2 corresponding to the specific component that is one of the components S1 by performing the opening and closing of the shutter mechanism 432 at a timing when the fluorescent light L2 corresponding to the specific component reaches the imager 43, for each event corresponding to one irradiation of the energy beam L1 by the irradiator 3. As illustrated in FIG. 4, in the fourth step, as described above, the imager 43 is allowed to execute the imaging processing while changing the specific component (the components S10, S20, S30, and S40) for the each event, in the plurality of events of the first event to the fourth event. In the fourth step, as described above, a timing for each of the components S1 is set by adjusting the opening and closing timing of the shutter mechanism 432 based on the reference point R1.

As described above, in the first step of the mass spectrometry method, the plurality of components S1 of the sample S are ionized while maintaining the position information of the plurality of components S1. That is, such a mass spectrometry method is a projection mass spectrometry method. Accordingly, the spatial resolution of the mass spectrometry can be improved. In addition, in the fourth step, the imager 43 is allowed to image the fluorescent light L2 corresponding to each of the plurality of components S1 by performing the opening and closing of the shutter mechanism 432 at a timing for each of the components S1. Accordingly, the fluorescent light L2 can be imaged for each of the components S1. Accordingly, the amount of information in one imaging can be suppressed, and a decrease in the processing speed can be suppressed. In addition, the afterglow time of the fluorescent body 42 is 12 ns or shorter. That is, the afterglow time of the fluorescent body 42 is short. Accordingly, even when an interval between a timing of one ionized sample S2 and a timing of the other ionized sample S2 is short, in the third step, the fluorescent body 42 is capable of emitting the fluorescent light L2 corresponding to the other ionized sample S2 without being affected by the afterglow corresponding to the one ionized sample S2. Accordingly, the fluorescent light L2 corresponding to the ionized sample S2 can be accurately imaged. Therefore, according to the mass spectrometry method, the accuracy of the mass spectrometry can be improved, and the improvement of the spatial resolution and the suppression of a decrease in the processing speed can be attained.

In the fourth step, the imager 43 is allowed to execute the imaging processing of imaging only the fluorescent light L2 corresponding to the specific component that is one of the components S1 by performing the opening and closing of the shutter mechanism 432 at a timing when the fluorescent light L2 corresponding to the specific component reaches the imager 43, for each event corresponding to one irradiation of the energy beam L1 by the irradiator 3. In the fourth step, the imager 43 is allowed to execute the imaging processing while changing the specific component for the each event, in the plurality of events. Accordingly, the fluorescent light L2 corresponding to the plurality of components S1 can be imaged while suppressing the amount of information in one imaging.

In the fourth step, a timing for each of the components S1 is set by adjusting the opening and closing timing of the shutter mechanism 432 based on the reference point R1. Accordingly, the fluorescent light L2 can be flexibly imaged for each of the components S1.

MODIFICATION EXAMPLES

One embodiment of the present disclosure has been described, but the present disclosure is not limited to the embodiment described above (First Modification Example of Control of Shutter Mechanism)

Figure 5:
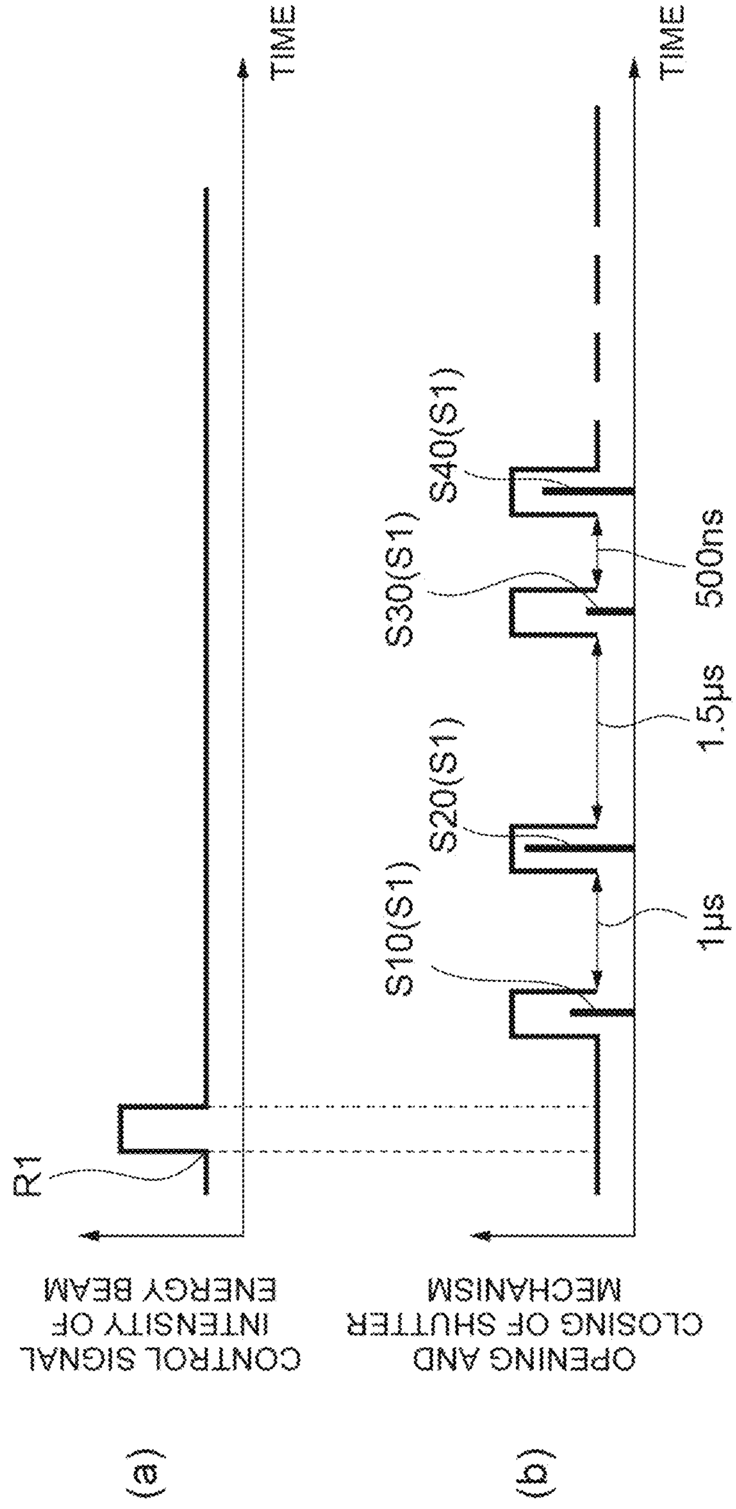
FIG. 5 is a diagram illustrating a first modification example of control of the shutter mechanism.

In the embodiment described above, an example has been described in which the controller 5 allows the imager 43 to execute the imaging processing while changing the specific component for the each event, in the plurality of events, but the present disclosure is not limited thereto. FIG. 5 is a diagram illustrating a first modification example of the control of the shutter mechanism 432. (a) in FIG. 5 is a diagram illustrating the reference point R1. (b) in FIG. 5 is a diagram illustrating the opening and closing timing of the shutter mechanism 432 in one event. As illustrated in FIG. 5, the controller 5 may perform the opening and closing of the shutter mechanism 432 a plurality of times at a timing when the fluorescent light L2 corresponding to each of the plurality of components S1 (the components S10, S20, S30, and S40) reaches the imager 43, in one event corresponding to one irradiation of the energy beam L1 by the irradiator 3. That is, the controller 5 may allow the imager 43 to image a plurality of fluorescent light L2 corresponding to the plurality of components S1, in one event. Accordingly, the fluorescent light L2 corresponding to the plurality of components S1 can be efficiently imaged in one event while suppressing the amount of information in one imaging. The interval of the opening and closing of the shutter mechanism 432, for example, can be set to values different from each other, such as 1 μs, 1.5 μs, or 500 ns.

Figure 6:
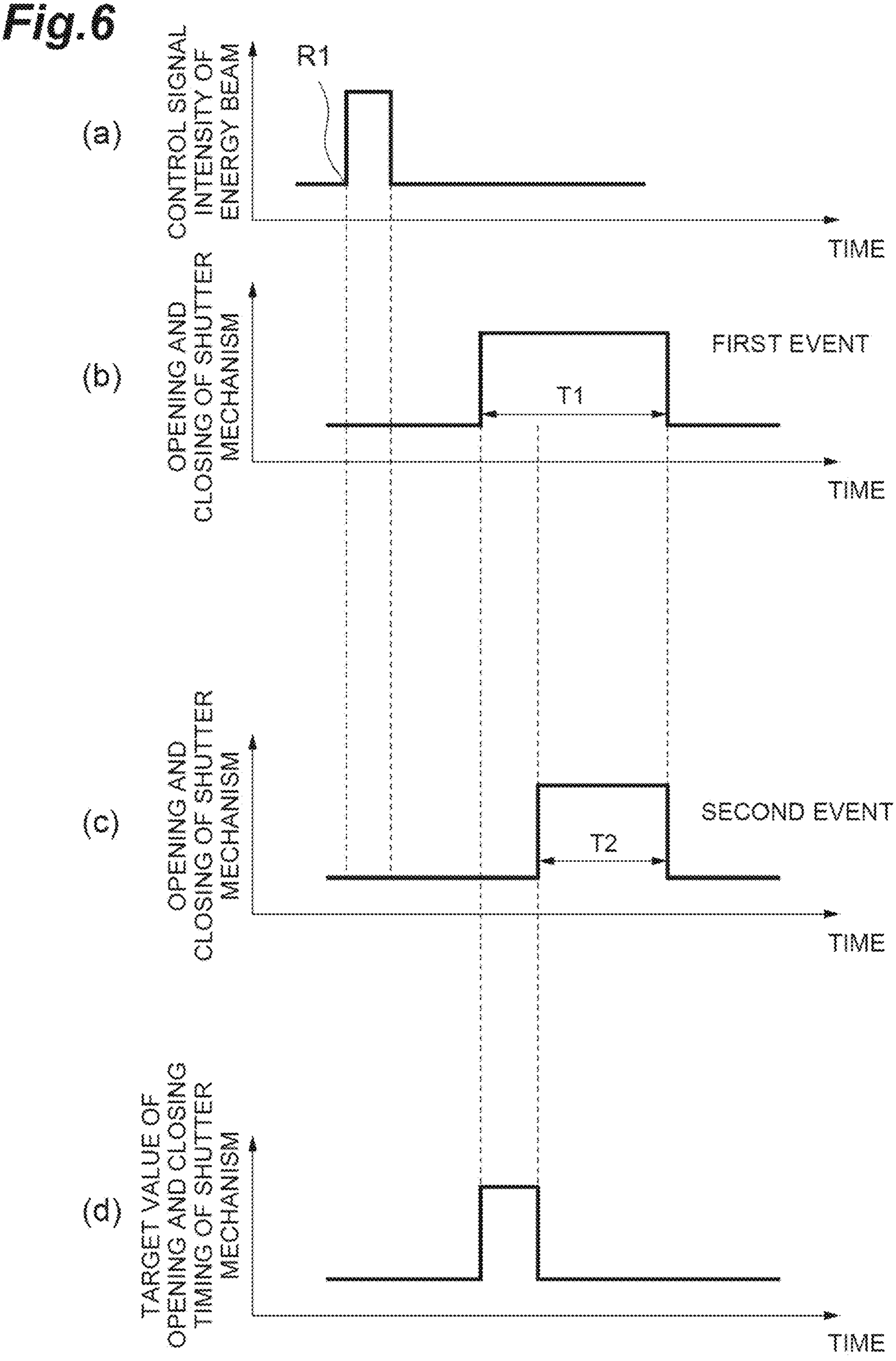
FIG. 6 is a diagram illustrating a second modification example of the control of the shutter mechanism.

(Second Modification Example of Control of Shutter Mechanism) FIG. 6 is a diagram illustrating a second modification example of the control of the shutter mechanism 432. (a) in FIG. 6 is a diagram illustrating the reference point R1. Each of (b) and (c) in FIG. 6 is a diagram illustrating the opening and closing timing of the shutter mechanism 432 in each of the first event and the second event. (d) in FIG. 6 is a diagram illustrating a target value of the opening and closing timing of the shutter mechanism 432 for imaging the fluorescent light L2 corresponding to the specific component.

As illustrated in (b) in FIG. 6, the controller 5 may perform the opening and closing of the shutter mechanism 432 such that the shutter mechanism 432 is in the open state during a first period T1, in the first event, and as illustrated in (c) in FIG. 6, the controller 5 may perform the opening and closing of the shutter mechanism 432 such that the shutter mechanism 432 is in the open state during a second period T2, in the second event different from the first event. The first period T1 includes a time point when the fluorescent light L2 corresponding to each of n (n is an integer of 2 or more) components S1 (for example, four components S10, S20, S30, and S40 illustrated in FIG. 4) reaches the imager 43. That is, the first period T1 is a period in which all of the fluorescent light L2 corresponding to each of the n components S1 reach the imager 43. The second period T2 includes a time point when the fluorescent light L2 corresponding to each of n−1 components S1 (the components S20, S30, and S40) excluding the specific component (for example, the component S10) from the n components S1 reaches the imager 43. That is, the second period T2 is a period in which all of the fluorescent light L2 corresponding to each of n−1 components S1 reach the imager 43.

A difference between the first period T1 and the second period T2 corresponds to the period of the opening and closing of the shutter mechanism 432 for imaging the fluorescent light L2 corresponding to the specific component (here, the component S10, as an example). That is, a period excluding a period overlapping with the second period T2 from the first period T1 is a period in which only the fluorescent light L2 corresponding to the component S10 that is the specific component, among the plurality of components S10, S20, S30, and S40, is imaged. Therefore, the data processor 6 may acquire the image corresponding to the specific component, on the basis of a difference between an image corresponding to the first period T1 that is imaged by the imager 43 in the first event and an image corresponding to the second period T2 that is imaged by the imager 43 in the second event. Accordingly, the limitation of the shutter speed of the shutter mechanism 432 can be eased. That is, even when the fluorescent light L2 corresponding to the component S1 different from the specific component is imaged during the period of the open state due to a comparatively slow shutter speed of the shutter mechanism 432 (that is, a comparatively long period of the open state), the image corresponding to the specific component can be acquired.

In addition, the controller 5 may allow the imager 43 to execute the imaging processing of imaging only the fluorescent light L2 corresponding to the specific component that is one of the components S1 by performing the opening and closing of the shutter mechanism 432 at a timing when the fluorescent light L2 corresponding to the specific component reaches the imager 43, for each event corresponding to one irradiation of the energy beam L1 by the irradiator 3. In addition, the controller 5 may allow the imager 43 to execute the imaging processing described above for the each event, in the plurality of events. That is, the controller 5 may allow the imager 43 to image the fluorescent light L2 corresponding to the same specific component, in the each event. Specifically, the controller 5 performs the opening and closing of the shutter mechanism 432 at the same timing when the fluorescent light L2 corresponding to the same specific component reaches the imager 43, in the each event. Accordingly, the fluorescent light L2 corresponding to one specific component can be imaged a plurality of times. That is, a plurality of images are obtained for the same component (specific component) S1. According to the configuration described above, a clear image focusing on only one specific component among the plurality of components S1 can be obtained by superimposing (integrating) the plurality of images obtained as described above.

In addition, an example has been described in which the controller 5 sets a timing for each of the components S1 by adjusting the opening and closing timing of the shutter mechanism 432 based on the reference point R1, but the present disclosure is not limited thereto. The controller 5 may set a timing for each of the components S1 by adjusting at least one of the opening and closing timing of the shutter mechanism 432 based on the reference point R1, the distance between the sample stage 2 and the MCP 41, and a flight speed of the ionized sample S2. The flight speed of the ionized sample S2, for example, can be set by adjusting the potential difference between the sample stage 2 and the MCP 41.

In addition, in the fourth step of the mass spectrometry method, as described above, the opening and closing of the shutter mechanism 432 may be performed a plurality of times for each timing when the fluorescent light L2 corresponding to each of the plurality of components S1 reaches the imager 43, in one event corresponding to one irradiation of the energy beam L1 by the irradiator 3.

In addition, in the fourth step of the mass spectrometry method, as described above, the opening and closing of the shutter mechanism 432 may be performed such that the shutter mechanism 432 is in the open state during the first period T1, in the first event, and the opening and closing of the shutter mechanism 432 may be performed such that the shutter mechanism 432 is in the open state during the second period T2, in the second event different from the first event. In addition, in the fifth step, as described above, the image corresponding to the specific component may be acquired on the basis of the difference between the image corresponding to the first period T1 that is imaged by the imager 43 in the first event and the image corresponding to the second period T2 that is imaged by the imager 43 in the second event.

In addition, in the fourth step of the mass spectrometry method, as described above, the imager 43 may be allowed to execute the imaging processing of imaging only the fluorescent light L2 corresponding to the specific component that is one of the components S1 by performing the opening and closing of the shutter mechanism 432 at a timing when the fluorescent light L2 corresponding to the specific component reaches the imager 43, for each event corresponding to one irradiation of the energy beam L1 by the irradiator 3. In addition, in the fourth step, as described above, the imager 43 may be allowed to execute the imaging processing of imaging only the fluorescent light L2 corresponding to the specific component for the each event, in the plurality of events.

In addition, in the fourth step of the mass spectrometry method, as described above, a timing for each of the components S1 may be set by adjusting at least one of the opening and closing timing of the shutter mechanism 432 based on the reference point R1, the distance between the sample stage 2 and he MCP 41, and the flight speed of the ionized sample S2.

Hereinafter, some modification examples of the imaging unit (imaging units 4A to 4H according to first to eighth modification examples) will be described. The mass spectrometry device 1 may include any of the imaging units 4A to 4H described below, instead of the imaging unit 4 described above.

Figure 7:
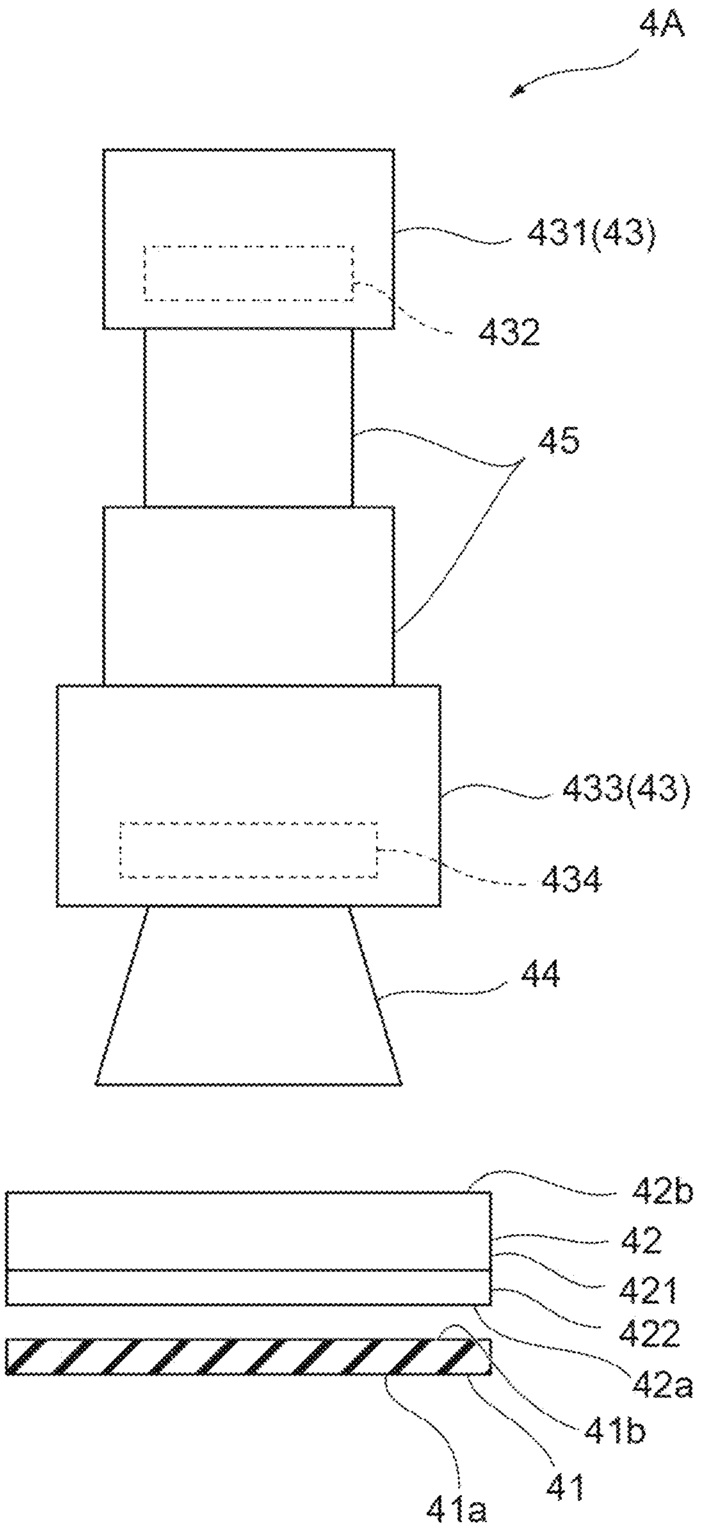
FIG. 7 is a schematic view illustrating a first modification example of an imaging unit.

(First Modification Example of Imaging Unit) FIG. 7 is a diagram illustrating the first modification example of the imaging unit (the imaging unit 4A). The imaging unit 4A is different from the imaging unit 4 in that an optical relay lens (a connection portion) 45 and an image intensifier 433 are further provided. In the imaging unit 4A, the imager 43 includes the solid-state image sensing device 431 and the image intensifier 433. The solid-state image sensing device 431 is disposed in the subsequent stage of the image intensifier 433. That is, the solid-state image sensing device 431 is disposed on a side of the image intensifier 433 opposite to the fluorescent body 42. The image intensifier 433 includes a shutter mechanism 434.

The image intensifier 433 includes a photoelectric surface provided on a side on which the light from the fluorescent body 42 is incident (the optical lens 44 side), the MCP, and a fluorescent surface. The photoelectric surface converts the light from the fluorescent body 42 into the electrons. The MCP multiplies the electrons. The fluorescent surface converts the multiplied electrons into light, and allows the light to exit to the solid-state image sensing device 431 side. The image intensifier 433, for example, is a high-speed gated image intensifier unit manufactured by HAMAMATSU PHOTONICS K.K. The shutter mechanism 434 includes the photoelectric surface and the MCP provided inside the image intensifier 433. Specifically, a state where the potential of the photoelectric surface is lower than the potential of the MCP corresponds to a state where the light converted by the photoelectric surface is attracted to the MCP (that is, the open state of the shutter mechanism 434), and a state where the potential of the photoelectric surface is higher than the potential of the MCP corresponds to a state where the light converted by the photoelectric surface is blocked by repelling from the MCP (that is, the close state of the shutter mechanism 434). That is, when the mass spectrometry device 1 includes the imaging unit 4A, the controller 5 (refer to FIG. 1) is capable of controlling the opening and closing of the shutter mechanism 434 by changing a potential between the photoelectric surface and the MCP of the image intensifier 433. The optical relay lens 45 is disposed between the image intensifier 433 and the solid-state image sensing device 431. The optical relay lens 45 optically connects the image intensifier 433 and the solid-state image sensing device 431.

In the imaging unit 4A, the opening and closing operation as described above may be performed by the shutter mechanism 434 instead of the shutter mechanism 432. In addition, the opening and closing operation as illustrated in (b) in FIG. 5 can also be attained by the shutter mechanism 432. In this case, for example, the interval of the opening and closing of the shutter mechanism 434, for example, can be set to values different from each other, such as 1 μs, 1.5 μs, or 500 ns, by operating the shutter mechanism 434 on the basis of a voltage signal generated by a comparatively high-performance function generator. By increasing power supplying capability of the image intensifier 433 and by increasing a frame rate of the solid-state image sensing device 431, the opening and closing of the shutter mechanism 434 can be performed a plurality of times, in one event.

According to the imaging unit 4A, the fluorescent light from the fluorescent body 42 can be amplified by the image intensifier 433 and imaged by the solid-state image sensing device 431. Accordingly, even when the light from the fluorescent body 42 is extremely weak, the light can be imaged. In addition, a shutter speed of the shutter mechanism 434 of the image intensifier 433 is faster than that of a mechanical shutter mechanism. Accordingly, by using the shutter mechanism 434 of the image intensifier 433, even when an interval between a timing of one component and a timing of the other component is short, the light corresponding to each of the components can be preferably allowed to pass through or blocked.

Figure 8:
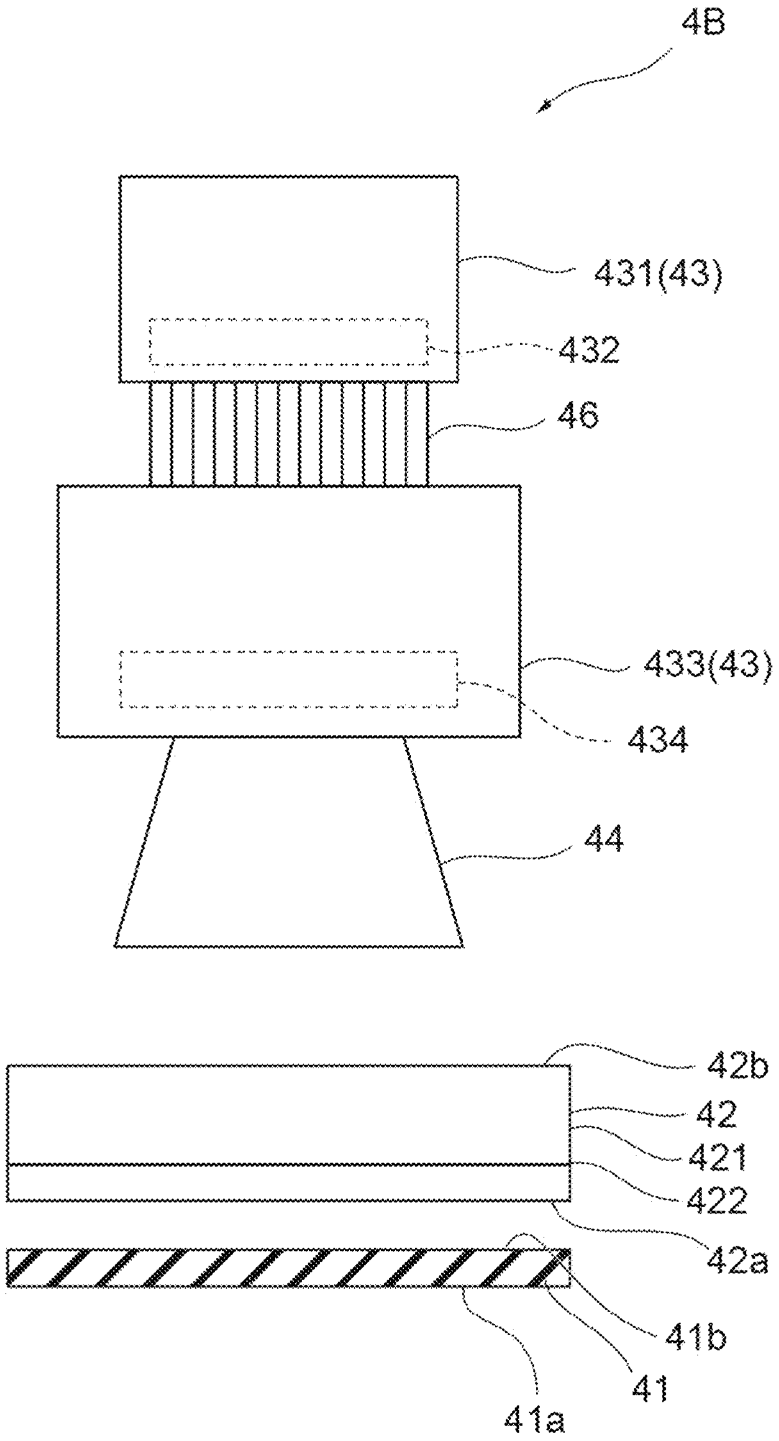
FIG. 8 is a schematic view illustrating a second modification example of the imaging unit.

(Second Modification Example of Imaging Unit) FIG. 8 is a diagram illustrating the second modification example of the imaging unit (the imaging unit 4B). The imaging unit 4B is different from the imaging unit 4A in that a fiber optical plate (FOP, a connection portion) 46 is provided instead of the optical relay lens 45. The FOP 46 is disposed between the image intensifier 433 and the solid-state image sensing device 431. The FOP 46 optically connects the image intensifier 433 and the solid-state image sensing device 431. Specifically, the imaging unit 4B has a configuration in which the FOP 46 is coupled onto the solid-state image sensing device 431. The FOP 46, for example, is an optical device formed by bundling several million of optical fibers having a width of approximately several μm. According to such a configuration, the configuration of the imaging unit 4B (the configuration of the connection portion between the image intensifier 433 and the solid-state image sensing device 431) can be compactified, optical adjustment is facilitated compared to a case of using the optical lens as the connection portion, and the amount of light can be improved.

Figure 9:
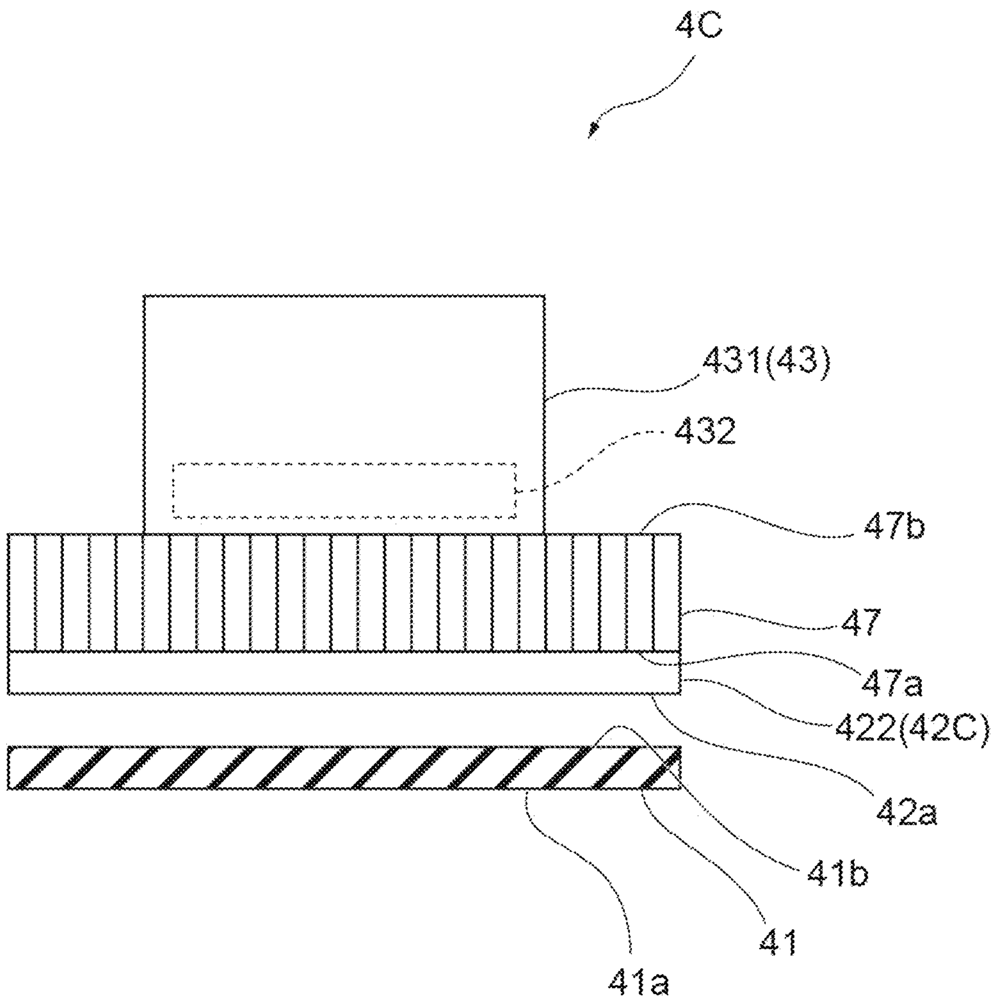
FIG. 9 is a schematic view illustrating a third modification example of the imaging unit.

(Third Modification Example of Imaging Unit) FIG. 9 is a diagram illustrating the third modification example of the imaging unit (the imaging unit 4C). The imaging unit 4C is different from the imaging unit 4 in that FOP (a connection portion) 47 is provided instead of the optical lens 44, and a fluorescent body 42C is provided instead of the fluorescent body 42. The fluorescent body 42C is different from the fluorescent body 42 in that the substrate 421 is not provided. That is, the fluorescent body 42C includes only the fluorescent layer 422. The FOP 47 is disposed between the fluorescent body 42C and the imager 43. The fluorescent body 42C is formed on one surface 47*a* of the FOP 47 on a side opposite to the imager 43. The fluorescent body 42C, for example, may be formed by applying a fluorescent material containing a plate-shaped (block-shaped) or liquid plastic scintillator onto the one surface 47*a* of the FOP 47 and drying the fluorescent material. Alternatively, the fluorescent body 42C, for example, may be formed by applying a powder fluorescent material containing ZnO onto the one surface 47*a* of the FOP 47. The thickness of the fluorescent body 42C of the latter case, for example, is approximately 2 μm to 8 μm. The other surface (a surface on a side opposite to the one surface 47*a*) 47*b* of the FOP 47 is connected to the imager 43. The FOP 47 optically connects the fluorescent body 42C and the imager 43. According to the imaging unit 4C, the fluorescent body 42C and the imager 43 can be optically connected by a simple configuration.

Figure 10:
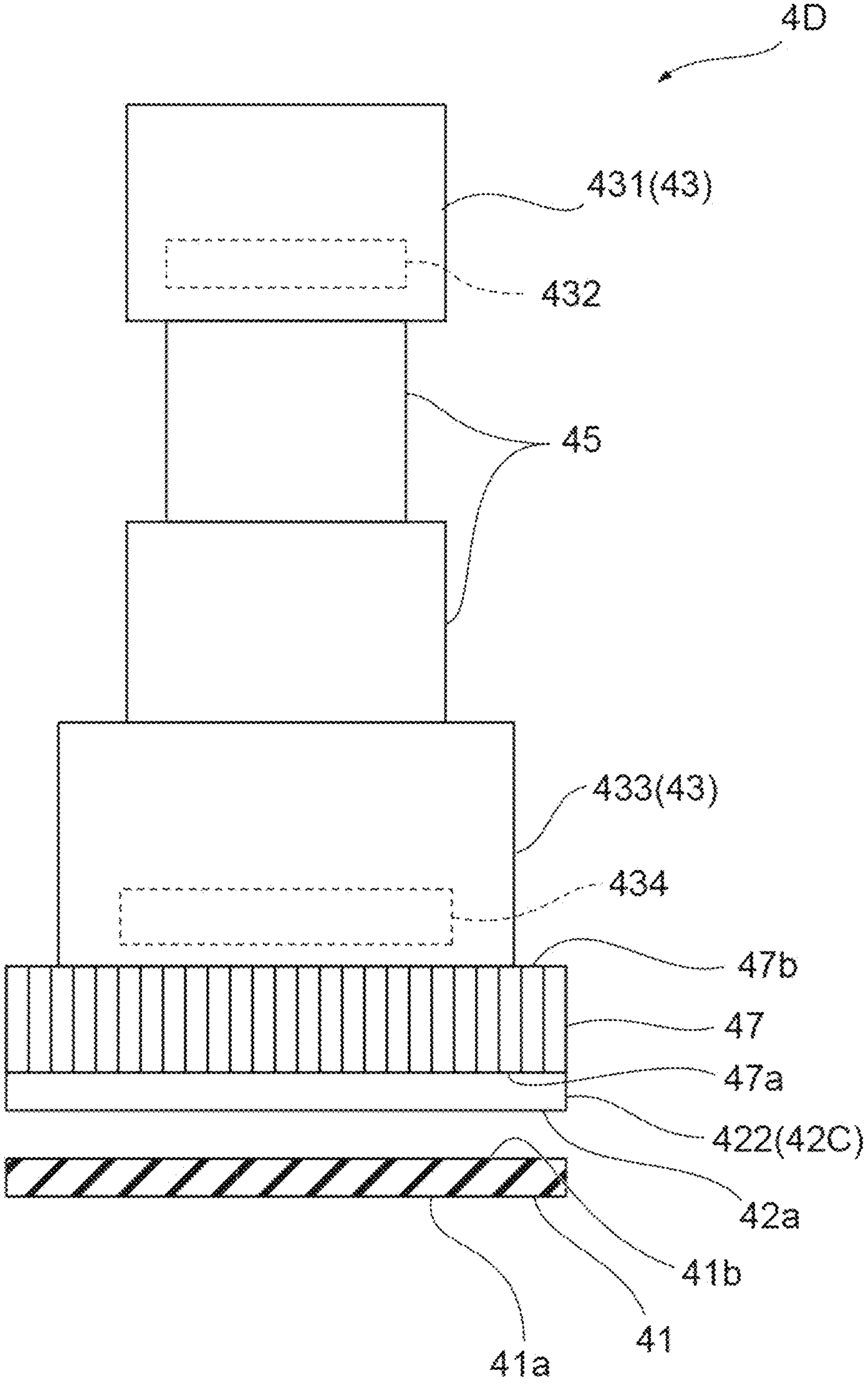
FIG. 10 is a schematic view illustrating a fourth modification example of the imaging unit.

(Fourth Modification Example of Imaging Unit) FIG. 10 is a diagram illustrating the fourth modification example of the imaging unit (the imaging unit 4D). The imaging unit 4D is different from the imaging unit 4A in that the FOP 47 is provided instead of the optical lens 44, and the fluorescent body 42C is provided instead of the fluorescent body 42. The FOP 47 is disposed between the fluorescent body 42C and the image intensifier 433 of the imager 43. The other surface 47*b* of the FOP 47 is connected to the image intensifier 433. The FOP 47 optically connects the fluorescent body 42C and the image intensifier 433.

Figure 11:
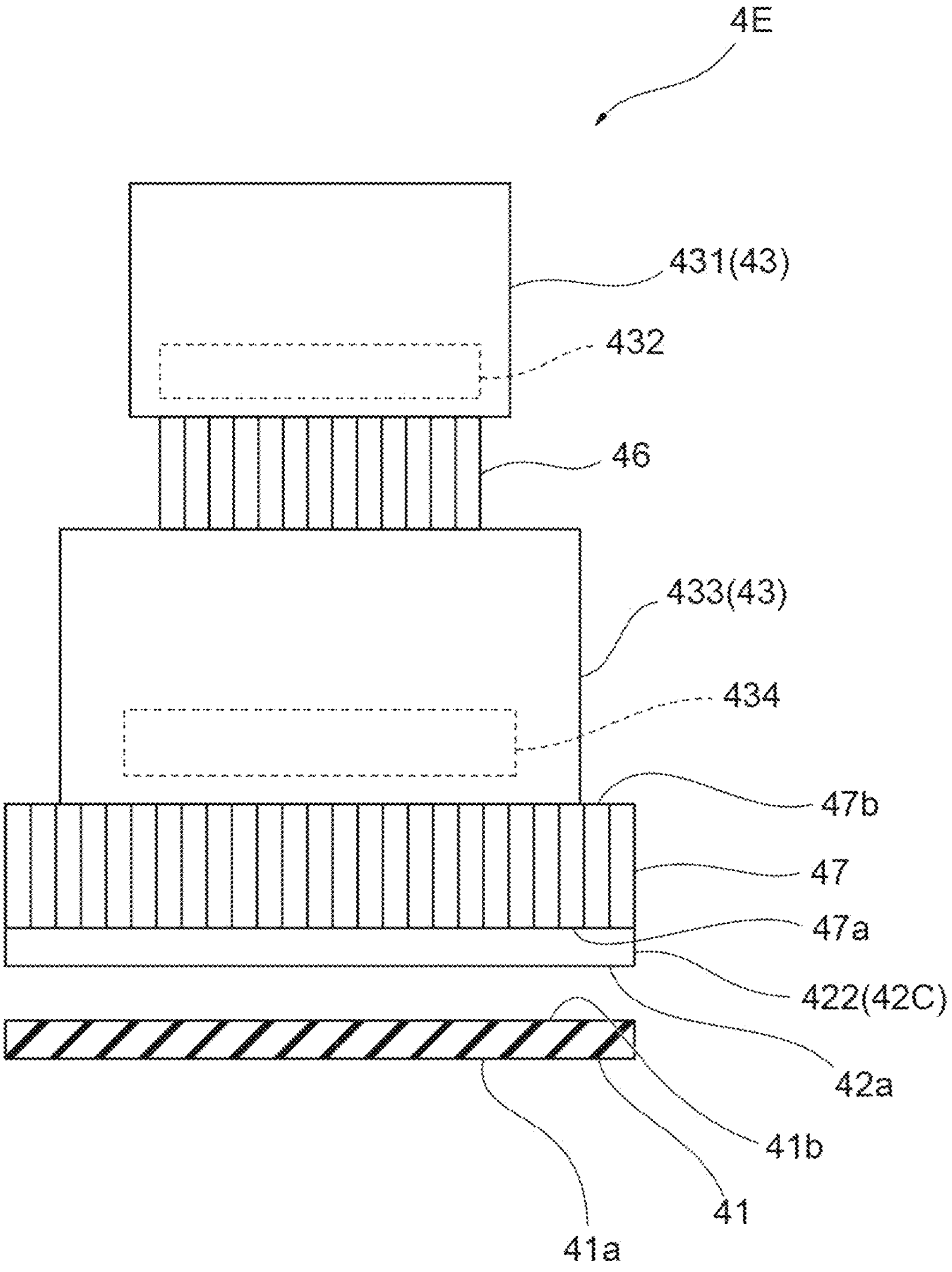
FIG. 11 is a schematic view illustrating a fifth modification example of the imaging unit.

(Fifth Modification Example of Imaging Unit) FIG. 11 is a diagram illustrating the fifth modification example of the imaging unit (the imaging unit 4E). The imaging unit 4E is different from the imaging unit 4D in that the FOP 46 is provided instead of the optical relay lens 45.

Figure 12:
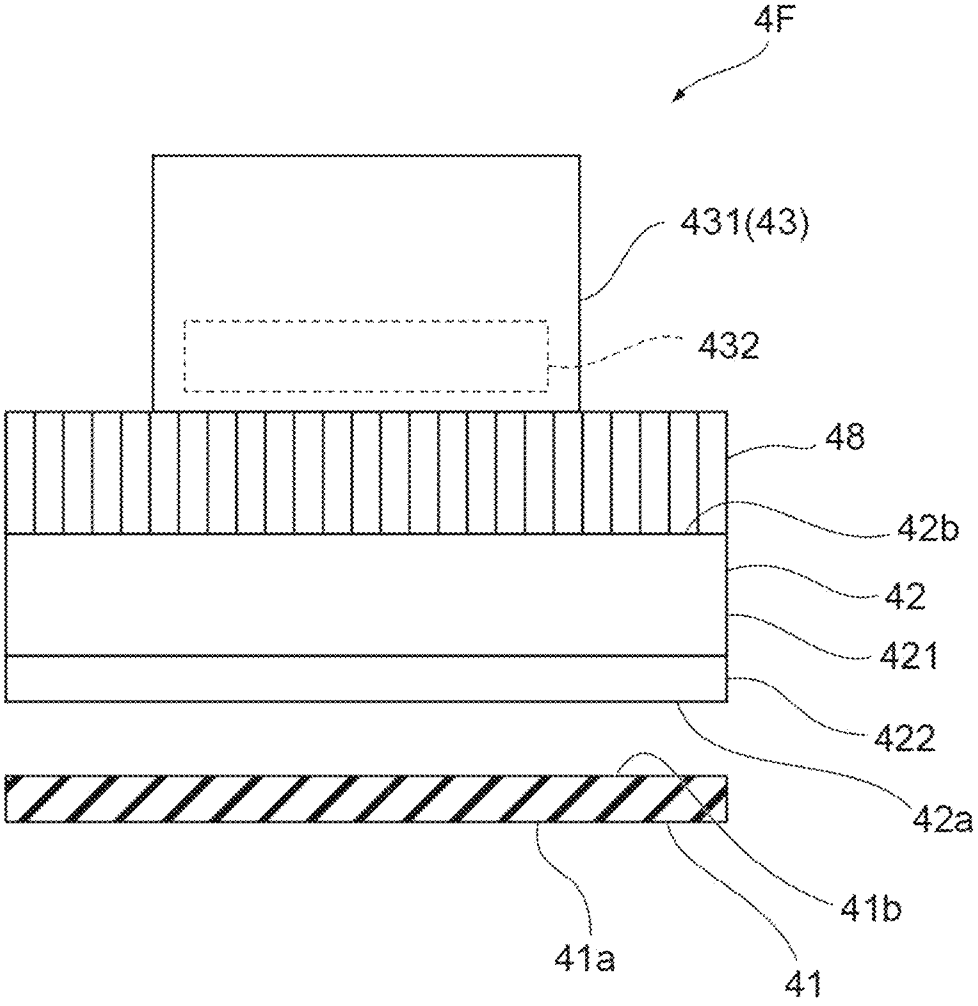
FIG. 12 is a schematic view illustrating a sixth modification example of the imaging unit.

(Sixth Modification Example of Imaging Unit) FIG. 12 is a diagram illustrating the sixth modification example of the imaging unit (the imaging unit 4F). The imaging unit 4F is different from the imaging unit 4 in that FOP (a connection portion) 48 is provided instead of the optical lens 44. The FOP 48 is disposed between the fluorescent body 42 and the imager 43. The FOP 48 is connected to the fluorescent body 42 and the imager 43. The FOP 48 optically connects the fluorescent body 42 and the imager 43. The configuration of the imaging unit 4E is effective when it is difficult to directly form the fluorescent layer 422 on the FOP 48. Specifically, when adopting the configuration of the imaging unit 4E, first, the fluorescent body 42 can be formed by forming the fluorescent layer 422 on the surface of the substrate 421 and by grinding the substrate 421 to be thin. Subsequently, the fluorescent body 42 can be pasted to the FOP 48.

Figure 13:
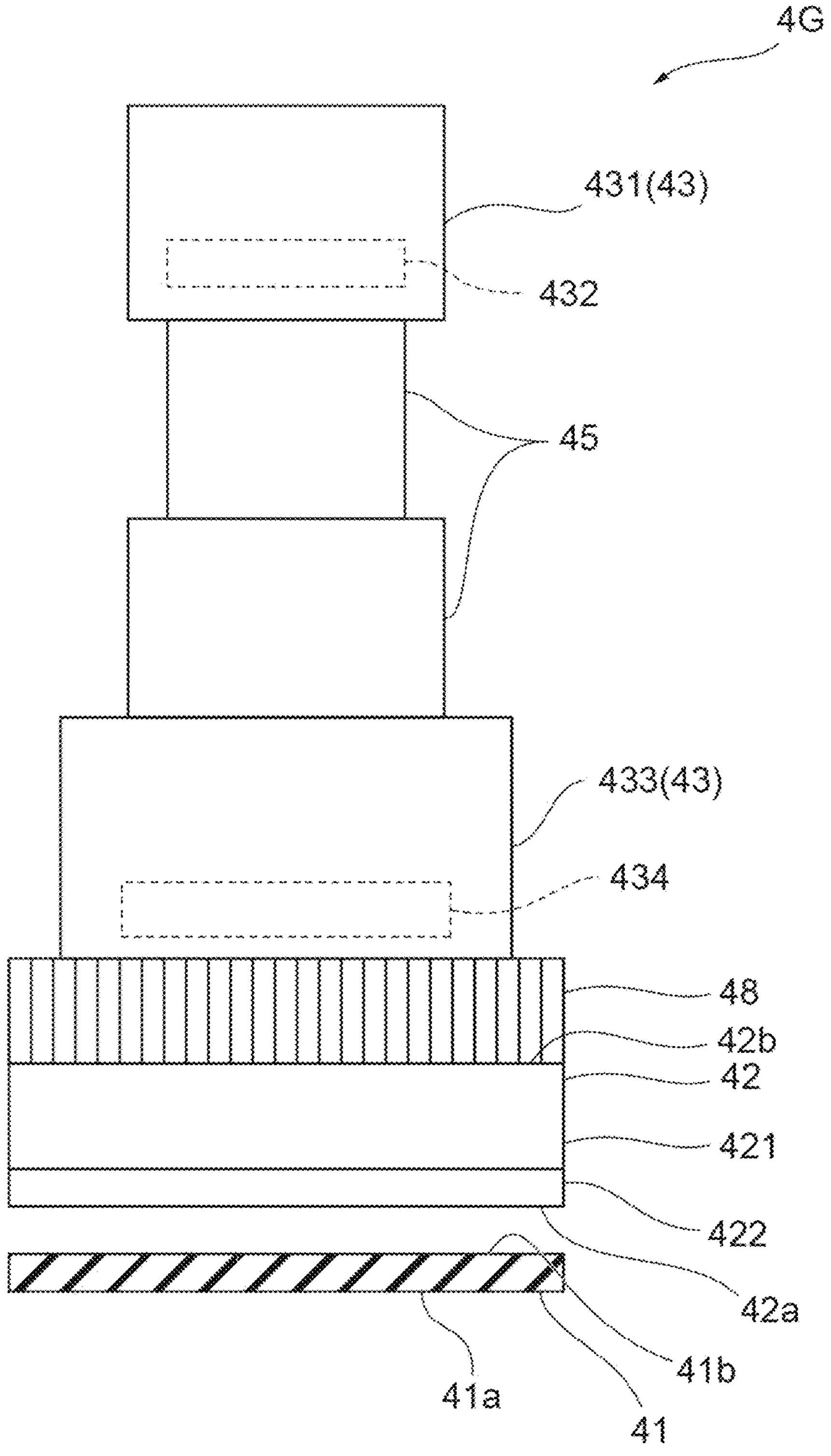
FIG. 13 is a schematic view illustrating a seventh modification example of the imaging unit.

(Seventh Modification Example of Imaging Unit) FIG. 13 is a diagram illustrating the seventh modification example of the imaging unit (the imaging unit 4G). The imaging unit 4G is different from the imaging unit 4A in that the FOP 48 is provided instead of the optical lens 44. The FOP 48 is disposed between the fluorescent body 42 and the image intensifier 433. The FOP 48 is connected to the fluorescent body 42 and the image intensifier 433. The FOP 48 optically connects the fluorescent body 42 and the image intensifier 433.

Figure 14:
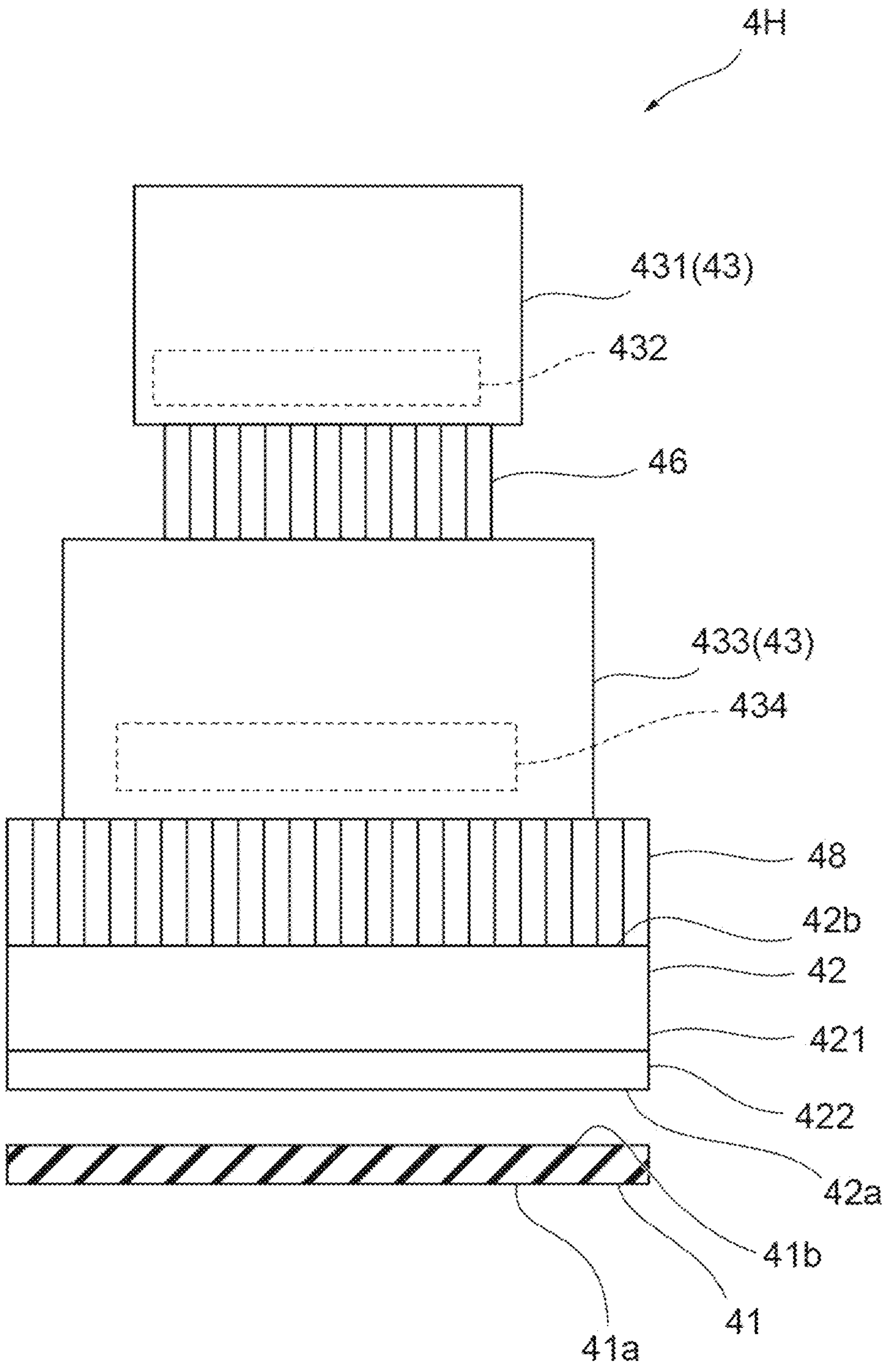
FIG. 14 is a schematic view illustrating an eighth modification example of the imaging unit.

(Eighth Modification Example of Imaging Unit) FIG. 14 is a diagram illustrating the eighth modification example of the imaging unit (the imaging unit 4H). The imaging unit 4H is different from the imaging unit 4B in that the FOP 48 is provided instead of the optical lens 44. The FOP 48 is disposed between the fluorescent body 42 and the image intensifier 433. The FOP 48 is connected to the fluorescent body 42 and the image intensifier 433. The FOP 48 optically connects the fluorescent body 42 and the image intensifier 433.

A part of the configurations in one embodiment or the modification examples described above may be arbitrarily applied to the configurations of the other embodiment or modification example.

REFERENCE SIGNS LIST

1: mass spectrometry device, 2: sample stage, 3: irradiator, 4, 4A, 4B, 4C, 4D, 4E, 4F, 4G, 4H: imaging unit, 41: micro-channel plate (MCP), 42: fluorescent body, 43: imager, 431: solid-state image sensing device, 432, 434: shutter mechanism, 433: image intensifier, 44: optical lens (connection portion), 45: optical relay lens (connection portion), 46, 47, 48: fiber optical plate (FOP, connection portion), 5: controller, 6: data processor, E: electron, L1: energy beam, L2: fluorescent light, S1: component, S: sample, S2: ionized sample, T1: first period, T2: second period.

The invention claimed is:

1. An imaging unit, comprising:

a micro-channel plate being provided on a flight route of an ionized sample that is a component of a sample ionized and emitting electrons in accordance with the ionized sample;

a fluorescent body being disposed in a subsequent stage of the micro-channel plate and emitting light in accordance with the electrons emitted from the micro-channel plate; and an imager being disposed in a subsequent stage of the fluorescent body and having a shutter mechanism configured to be capable of switching an open state in which the light is imaged by allowing the light from the fluorescent body to pass through and a close state in which the light is not imaged by blocking the light from the fluorescent body, wherein an afterglow time of the fluorescent body is 12 ns or shorter.

2. The imaging unit according to claim 1, wherein the imager includes an image intensifier having the shutter mechanism, and a solid-state image sensing device being disposed in a subsequent stage of the image intensifier.

3. The imaging unit according to claim 1, wherein a fluorescent material of the fluorescent body is GaN, ZnO, or a plastic scintillator.

4. The imaging unit according to claim 1, further comprising:

a connection portion optically connecting the fluorescent body and the imager, wherein the connection portion is a lens or a fiber optical plate.

5. The imaging unit according to claim 4, wherein the connection portion is the fiber optical plate, the fluorescent body is formed on one surface of the fiber optical plate on a side opposite to the imager, and the other surface of the fiber optical plate on a side opposite to the one surface is connected to the imager.

6. A mass spectrometry device, comprising:

the imaging unit according to claim 1;

a sample stage on which the sample is placed;

an irradiator irradiating the sample with an energy beam to ionize a plurality of components of the sample while maintaining position information of the plurality of components; and a controller controlling an opening and closing operation of the shutter mechanism, wherein the controller allows the imager to image the light corresponding to each of the plurality of components by performing the opening and closing of the shutter mechanism at a timing for each of the components.

7. The mass spectrometry device according to claim 6, wherein the controller allows the imager to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the controller allows the imager to execute the imaging processing while changing the specific component for the each event, in a plurality of events.

8. The mass spectrometry device according to claim 6, wherein the controller performs the opening and closing of the shutter mechanism a plurality of times for each timing when the light corresponding to each of the plurality of components reaches the imager, in one event corresponding to one irradiation of the energy beam by the irradiator.

9. The mass spectrometry device according to claim 6, further comprising:

a data processor processing data of an image imaged by the imager, wherein the controller performs the opening and closing of the shutter mechanism such that the shutter mechanism is in the open state during a first period including a time point when the light corresponding to each of n (n is an integer of 2 or more) components reaches the imager, in a first event corresponding to one irradiation of the energy beam by the irradiator, and performs the opening and closing of the shutter mechanism such that the shutter mechanism is in the open state during a second period including a time point when the light corresponding to each of n−1 components excluding a specific component from the n components reaches the imager, in a second event different from the first event, and the data processor acquires an image corresponding to the specific component, on the basis of a difference between an image imaged by the imager in the first event and an image imaged by the imager in the second event.

10. The mass spectrometry device according to claim 6, wherein the controller allows the imager to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the controller allows the imager to execute the imaging processing for the each event, in a plurality of events.

11. The mass spectrometry device according to claim 6, wherein the controller sets a timing for each of the components by adjusting at least one of an opening and closing timing of the shutter mechanism based on a time point when the energy beam is irradiated, a distance between the sample stage and the micro-channel plate, and a flight speed of the ionized sample.

12. A mass spectrometry method, comprising:

a first step of allowing an irradiator irradiating an energy beam to irradiate a sample with the energy beam to ionize a plurality of components of the sample while maintaining position information of the plurality of components;

a second step of allowing a micro-channel plate provided on a flight route of an ionized sample that is the component of the sample ionized by the irradiation of the energy beam to emit electrons in accordance with the ionized sample;

a third step of allowing a fluorescent body disposed in a subsequent stage of the micro-channel plate to emit light in accordance with the electrons; and a fourth step of allowing an imager being disposed in a subsequent stage of the fluorescent body and having a shutter mechanism configured to be capable of switching an open state in which the light is imaged by allowing the light from the fluorescent body to pass through and a close state in which the light is not imaged by blocking the light from the fluorescent body to image the light, wherein in the fourth step, the imager is allowed to image the light corresponding to each of the plurality of components by performing the opening and closing of the shutter mechanism at a timing for each of the components, and an afterglow time of the fluorescent body is 12 ns or shorter.

13. The mass spectrometry method according to claim 12, wherein in the fourth step, imaging processing of imaging only the light corresponding to a specific component that is one of the components is executed by performing the opening and closing of the shutter mechanism at a timing when the light corresponding to the specific component reaches the imager, for each event corresponding to one irradiation of the energy beam by the irradiator, and the imaging processing is executed while changing the specific component for the each event, in a plurality of events.

14. The mass spectrometry method according to claim 12, wherein in the fourth step, the opening and closing of the shutter mechanism is performed a plurality of times for each timing when the light corresponding to each of the plurality of components reaches the imager, in one event corresponding to one irradiation of the energy beam by the irradiator.

15. The mass spectrometry method according to claim 12, further comprising:

a fifth step of processing data of an image imaged by the imager, wherein in the fourth step, the opening and closing of the shutter mechanism is performed such that the shutter mechanism is in the open state during a first period including a time point when the light corresponding to each of n (n is an integer of 2 or more) components reaches the imager, in a first event corresponding to one irradiation of the energy beam by the irradiator, and the opening and closing of the shutter mechanism is performed such that the shutter mechanism is in the open state during a second period including a time point when the light corresponding to each of n−1 components excluding a specific component from the n components reaches the imager, in a second event different from the first event, and in the fifth step, an image corresponding to the specific component is acquired on the basis of a difference between an image imaged by the imager in the first event and an image imaged by the imager in the second event.

16. The mass spectrometry method according to claim 12, wherein in the fourth step, the imager is allowed to execute imaging processing of imaging only the light corresponding to a specific component that is one of the components by performing the opening and closing of the shutter mechanism at a timing when the light corresponding to the specific component reaches the imager, for each event corresponding to one irradiation of the energy beam by the irradiator, and the imager is allowed to execute the imaging processing for the each event, in a plurality of events.

17. The mass spectrometry method according to claim 12, wherein in the fourth step, a timing for each of the components is set by adjusting at least one of an opening and closing timing of the shutter mechanism based on a time point when the energy beam is irradiated, a distance between a sample stage on which the sample is placed and the micro-channel plate, and a flight speed of the ionized sample.

* * * * *